(12) United States Patent
Kelliher et al.

(10) Patent No.: US 9,234,157 B2
(45) Date of Patent: Jan. 12, 2016

(54) SMB PROCESS

(75) Inventors: Adam Kelliher, Greater London (GB); Angus Morrison, Greater London (GB); Anil Oroskar, Lombard, IL (US); Rakesh Vikraman Nair Rema, Lombard, IL (US); Abhilesh Agarwal, Lombard, IL (US)

(73) Assignee: BASF Pharma Callanish Limited, Cheadle, Cheshire (GB)

( * ) Notice: Subject to any disclaimer, the term of this patent is extended or adjusted under 35 U.S.C. 154(b) by 0 days.

(21) Appl. No.: 13/880,154

(22) PCT Filed: Jul. 6, 2012

(86) PCT No.: PCT/GB2012/051597
§ 371 (c)(1),
(2), (4) Date: Jun. 7, 2013

(87) PCT Pub. No.: WO2013/005052
PCT Pub. Date: Jan. 10, 2013

(65) Prior Publication Data
US 2014/0200360 A1    Jul. 17, 2014

(30) Foreign Application Priority Data

Jul. 6, 2011    (GB) .................................. 1111591.2

(51) Int. Cl.
*C11B 3/10*    (2006.01)
*C11C 1/02*    (2006.01)
(Continued)

(52) U.S. Cl.
CPC ................ *C11C 1/02* (2013.01); *B01D 15/185* (2013.01); *B01D 15/1892* (2013.01); *C11B 7/0008* (2013.01); *C11B 7/0025* (2013.01); *C11C 1/005* (2013.01); *C11C 1/007* (2013.01)

(58) Field of Classification Search
CPC ........... C11B 3/10; B01D 15/02; B01D 15/08
USPC ....................................................... 554/193
See application file for complete search history.

(56) References Cited

U.S. PATENT DOCUMENTS

| 2,985,589 A | 5/1961 | Broughton et al. |
|---|---|---|
| 3,696,107 A | 10/1972 | Neuzil |

(Continued)

FOREIGN PATENT DOCUMENTS

| DK | 1338316 | 3/2005 |
|---|---|---|
| DK | 1128881 | 10/2005 |

(Continued)

OTHER PUBLICATIONS

Szepesy, et al., "Journal of Chromatography", vol. 108, No. 2, 1975, pp. 285-297.

(Continued)

*Primary Examiner* — Deborah D Carr
(74) *Attorney, Agent, or Firm* — Servilla Whitney LLC

(57) ABSTRACT

The present invention provides a chromatographic separation process for recovering a polyunsaturated fatty acid (PUFA) product from a feed mixture, which process comprises the steps of: (i) purifying the feed mixture in a first separation step in a simulated or actual moving bed chromatography apparatus having a plurality of linked chromatography columns containing, as eluent, an aqueous organic solvent, to obtain an intermediate product; and (ii) purifying the intermediate product obtained in (i) in a second separation step using a simulated or actual moving bed chromatography apparatus having a plurality of linked chromatography columns containing, as eluent, an aqueous organic solvent, to obtain the PUFA product; wherein (a) the first and second separation steps are carried out sequentially on the same chromatography apparatus, the intermediate product being recovered between the first and second separation steps and the process conditions in the chromatography apparatus being adjusted between the first and second separation steps such that the PUFA product is separated from different components of the feed mixture in each separation step; or (b) the first and second separation steps are carried out on separate first and second chromatography apparatuses respectively, the intermediate product obtained from the first separation step being introduced into the second chromatography apparatus, and the PUFA product being separated from different components of the feed mixture in each separation step.

17 Claims, 16 Drawing Sheets

(51) Int. Cl.
  *B01D 15/18* (2006.01)
  *C11C 1/00* (2006.01)
  *C11B 7/00* (2006.01)

(56) References Cited

U.S. PATENT DOCUMENTS

| | | | |
|---|---|---|---|
| 3,706,812 A | 12/1972 | Derosset et al. |
| 3,761,533 A | 9/1973 | Otani et al. |
| 4,036,745 A | 7/1977 | Broughton |
| 4,048,111 A | 9/1977 | Rosback et al. |
| 4,048,205 A | 9/1977 | Neuzil et al. |
| 4,049,688 A | 9/1977 | Neuzil et al. |
| 4,313,015 A | 1/1982 | Broughton |
| 4,329,280 A | 5/1982 | Cleary et al. |
| 4,353,838 A | 10/1982 | Cleary et al. |
| 4,353,839 A | 10/1982 | Cleary et al. |
| 4,404,145 A | 9/1983 | Cleary et al. |
| 4,433,195 A | 2/1984 | Kulprathipanja |
| 4,486,618 A | 12/1984 | Kulprathipanja et al. |
| 4,495,106 A | 1/1985 | Cleary et al. |
| 4,511,514 A | 4/1985 | Cleary et al. |
| 4,519,952 A | 5/1985 | Cleary et al. |
| 4,521,343 A | 6/1985 | Chao et al. |
| 4,522,761 A | 6/1985 | Cleary et al. |
| 4,524,029 A | 6/1985 | Cleary et al. |
| 4,524,030 A | 6/1985 | Cleary et al. |
| 4,529,551 A | 7/1985 | Cleary et al. |
| 4,560,675 A | 12/1985 | Cleary et al. |
| 4,605,783 A | 8/1986 | Zinnen |
| 4,720,579 A | 1/1988 | Kulprathipanja |
| 4,764,276 A | 8/1988 | Berry et al. |
| 4,882,065 A | 11/1989 | Barder |
| 4,902,829 A | 2/1990 | Kulprtahipanja |
| 4,961,881 A | 10/1990 | Ou |
| 5,068,418 A | 11/1991 | Kulprathipanja et al. |
| 5,068,419 A | 11/1991 | Kulprathipanja et al. |
| 5,069,883 A | 12/1991 | Matonte |
| 5,093,004 A | 3/1992 | Hotier et al. |
| 5,114,590 A | 5/1992 | Hotier et al. |
| 5,179,219 A | 1/1993 | Priegnitz |
| 5,225,580 A | 7/1993 | Zinnen |
| 5,405,534 A | 4/1995 | Ishida et al. |
| 5,422,007 A | 6/1995 | Nicoud et al. |
| 5,502,077 A | 3/1996 | Breivik et al. |
| 5,547,580 A | 8/1996 | Tsujii et al. |
| 5,656,667 A | 8/1997 | Breivik et al. |
| 5,698,594 A | 12/1997 | Breivik et al. |
| 5,719,302 A * | 2/1998 | Perrut et al. ............. 554/191 |
| 5,777,141 A | 7/1998 | Brunner et al. |
| 5,840,181 A | 11/1998 | Patton et al. |
| 5,917,068 A | 6/1999 | Barnicki et al. |
| 5,945,318 A | 8/1999 | Breivik et al. |
| 6,013,186 A | 1/2000 | Patton et al. |
| 6,063,284 A | 5/2000 | Grill |
| 6,096,218 A | 8/2000 | Hauck |
| 6,136,198 A | 10/2000 | Adam et al. |
| 6,204,401 B1 | 3/2001 | Perrut et al. |
| 6,313,330 B1 | 11/2001 | Kiyohara et al. |
| 6,325,898 B1 | 12/2001 | Blehaut et al. |
| 6,350,890 B1 | 2/2002 | Kiy et al. |
| 6,409,923 B1 | 6/2002 | Nicoud et al. |
| 6,413,419 B1 | 7/2002 | Adam et al. |
| 6,471,870 B1 | 10/2002 | Nicoud |
| 6,518,049 B1 | 2/2003 | Haraldsson et al. |
| 6,544,413 B1 | 4/2003 | Nagamatsu et al. |
| 6,713,447 B2 | 3/2004 | Beaudoin et al. |
| 6,789,502 B2 | 9/2004 | Hjaltason et al. |
| 6,863,824 B2 | 3/2005 | Hamende et al. |
| 6,979,402 B1 | 12/2005 | Sprague et al. |
| 7,063,855 B2 | 6/2006 | Hjaltason et al. |
| 7,462,643 B1 | 12/2008 | Pamparana |
| 7,491,522 B2 | 2/2009 | Haraldsson et al. |
| 7,541,480 B2 | 6/2009 | Bruzzese |
| 7,588,791 B2 | 9/2009 | Fabritius |
| 7,667,061 B2 | 2/2010 | Binder et al. |
| 7,678,930 B2 | 3/2010 | Sondbo et al. |
| 7,705,170 B2 | 4/2010 | Geier et al. |
| 7,709,236 B2 | 5/2010 | Akimoto et al. |
| 7,718,698 B2 | 5/2010 | Breivik et al. |
| 7,732,488 B2 | 6/2010 | Breivik et al. |
| 7,807,848 B2 | 10/2010 | Wang |
| 8,063,235 B2 | 11/2011 | Krumbholz et al. |
| 8,216,475 B2 | 7/2012 | Valery et al. |
| 8,282,831 B2 | 10/2012 | Kessler et al. |
| 2002/0011445 A1 | 1/2002 | Lehoucq et al. |
| 2002/0068833 A1 | 6/2002 | Chanteloup et al. |
| 2002/0174769 A1 | 11/2002 | Adam et al. |
| 2003/0006191 A1 | 1/2003 | Heikkila et al. |
| 2003/0216543 A1 | 11/2003 | Wang et al. |
| 2003/0222024 A1 | 12/2003 | Hamende et al. |
| 2004/0099604 A1 | 5/2004 | Hauck |
| 2005/0087494 A1 | 4/2005 | Hauck et al. |
| 2006/0008667 A1 | 1/2006 | Kim et al. |
| 2006/0124549 A1 | 6/2006 | Bailly et al. |
| 2007/0068873 A1 | 3/2007 | Oroskar et al. |
| 2007/0148315 A1 | 6/2007 | Schaap et al. |
| 2007/0158270 A1 | 7/2007 | Geier et al. |
| 2007/0181504 A1 | 8/2007 | Binder et al. |
| 2008/0234375 A1 | 9/2008 | Breivik et al. |
| 2009/0023808 A1 | 1/2009 | Raman et al. |
| 2009/0176284 A1 | 7/2009 | Furihata et al. |
| 2010/0012584 A1 | 1/2010 | Majewski et al. |
| 2010/0069492 A1 | 3/2010 | Geiringer et al. |
| 2010/0104657 A1 | 4/2010 | Sondbo et al. |
| 2010/0160435 A1 | 6/2010 | Bruzzese |
| 2010/0163490 A1 | 7/2010 | Lasalle |
| 2010/0176058 A1 | 7/2010 | Bryntesson et al. |
| 2010/0186587 A1 | 7/2010 | Kessler et al. |
| 2010/0190220 A1 | 7/2010 | Furihata et al. |
| 2010/0197785 A1 | 8/2010 | Breivik et al. |
| 2010/0233281 A1 | 9/2010 | Breivik et al. |
| 2010/0267829 A1 | 10/2010 | Breivik et al. |
| 2010/0331559 A1 | 12/2010 | Feist et al. |
| 2010/0331561 A1 | 12/2010 | Schaap et al. |
| 2011/0000853 A1 | 1/2011 | Valery et al. |
| 2011/0015418 A1 | 1/2011 | Krumbholz et al. |
| 2011/0030457 A1 | 2/2011 | Valery et al. |
| 2011/0091947 A1 | 4/2011 | Kim et al. |
| 2011/0139001 A1 | 6/2011 | Hiliareau et al. |
| 2011/0168632 A1 | 7/2011 | Valery et al. |
| 2012/0214966 A1 | 8/2012 | Theoleyre et al. |
| 2012/0232141 A1 | 9/2012 | Hustvedt et al. |

FOREIGN PATENT DOCUMENTS

| | | |
|---|---|---|
| EP | 0255824 | 7/1987 |
| EP | 0697034 | 11/1994 |
| EP | 0981399 | 11/1998 |
| EP | 1152755 | 8/2000 |
| EP | 1106602 | 6/2001 |
| EP | 1250058 | 7/2001 |
| EP | 1250059 | 7/2001 |
| EP | 1157692 | 11/2001 |
| EP | 1392411 | 11/2002 |
| EP | 1436370 | 4/2003 |
| EP | 1523541 | 1/2004 |
| EP | 1534807 | 1/2004 |
| EP | 1685222 | 6/2005 |
| EP | 1749079 | 10/2005 |
| EP | 1982752 | 10/2008 |
| EP | 2173184 | 1/2009 |
| EP | 2173699 | 1/2009 |
| EP | 2169038 | 3/2010 |
| EP | 2295529 | 7/2012 |
| FR | 2103302 | 7/1971 |
| FR | 2651148 | 3/1991 |
| FR | 2651149 | 3/1991 |
| FR | 2897238 | 8/2007 |
| GB | 2221843 | 2/1990 |
| HK | 1078509 | 6/2006 |
| JP | 58-088339 | 5/1983 |
| JP | 58-109444 | 6/1983 |
| JP | 60-208940 | 10/1985 |
| JP | 61-192797 | 8/1986 |

(56) References Cited

FOREIGN PATENT DOCUMENTS

| | | |
|---|---|---|
| JP | S6388159 | 4/1988 |
| JP | 01-197596 | 8/1989 |
| JP | H01-197596 | 8/1989 |
| JP | 1992-235701 | 8/1992 |
| JP | H04-235701 | 8/1992 |
| JP | 6287594 | 10/1994 |
| JP | 09-157684 | 6/1997 |
| JP | H10-310555 | 11/1998 |
| JP | 11-057302 | 3/1999 |
| JP | 11-090105 | 4/1999 |
| JP | 2000280663 | 10/2000 |
| JP | 2001139981 | 5/2001 |
| SI | 1797021 | 4/2009 |
| WO | WO-8703899 | 7/1987 |
| WO | WO 94/25552 | 11/1994 |
| WO | WO-98/32514 | 7/1998 |
| WO | WO-99/47228 | 9/1999 |
| WO | WO 9947228 | 9/1999 |
| WO | WO 00/25885 | 5/2000 |
| WO | WO 01/87451 | 11/2001 |
| WO | WO 01/87452 | 11/2001 |
| WO | WO 01/87924 | 11/2001 |
| WO | WO 0187452 A2 * | 11/2001 |
| WO | WO 2005/100519 | 10/2005 |
| WO | WO 2007/012750 | 2/2007 |
| WO | WO 2007/017240 | 2/2007 |
| WO | WO 2007/038417 | 4/2007 |
| WO | WO 2007/075499 | 7/2007 |
| WO | WO 2007075499 A2 * | 7/2007 |
| WO | WO 2007/093690 | 8/2007 |
| WO | WO 2007/147554 | 12/2007 |
| WO | WO 2008/004900 | 1/2008 |
| WO | WO 2008/107562 | 9/2008 |
| WO | WO 2008/149177 | 12/2008 |
| WO | WO 2009/047408 | 4/2009 |
| WO | WO 2009/105351 | 8/2009 |
| WO | WO 2010/018423 | 2/2010 |
| WO | WO 2010/119319 | 10/2010 |
| WO | WO 2011/080503 | 7/2011 |
| WO | WO 2013/005046 | 1/2013 |
| WO | WO 2013/005047 | 1/2013 |
| WO | WO 2013/005048 | 1/2013 |
| WO | WO 2013/005051 | 1/2013 |
| WO | WO-2013/005052 | 1/2013 |
| ZA | 8905758 | 4/1990 |

OTHER PUBLICATIONS

Xie, et al., "Biotechnology Progress", *American Institute of Chemical Engineers* vol. 18, No. 6 2002, 1332-1344.
Non-Final Office Action in U.S. Appl. No. 13/880,146, dated Jul. 9, 2015, 6 pages.
Non-Final Office Action in U.S. Appl. No. 13/519,618, dated Jan. 23, 2015, 5 pages.
Non-Final Office Action in U.S. Appl. No. 13/880,145, dated Jun. 24, 2015, 15 pages.
Non-Final Office Action in U.S. Appl. No. 13/880,148, dated Feb. 20, 2015, 5 pages
"International Search Report and Written Opinion of PCT/GB2012/051591", mailed on Sep. 27, 2012, 16 pgs.
"International Search Report and Written Opinion of PCT/GB2012/051592", mailed on Sep. 27, 2012, 12 pgs.
"International Search Report and Written Opinion of PCT/GB2012/051593", mailed on Sep. 27, 2012, 13 pgs.
"International Search Report and Written Opinion of PCT/GB2012/051596", mailed on Sep. 27, 2012, 15 pgs.
"International Search Report and Written Opinion of PCT/GB2012/051597", mailed on Sep. 27, 2012, 15 pgs.
"International Search Report in PCT/GB2010/002339", mailed Jul. 7, 2011, 7 pages.
"International Search Report in PCT/GB2014/050054", mailed May 23, 2014, 5 pages.
"Written Opinion of the ISA in PCT/GB2010/002339", mailed Jun. 30, 2012, 10 pages.
"Written Opinion of the ISA in PCT/GB2014/050054", mailed Jul. 9, 2015, 6 pages.
Santos, M.A.G. et al., "Simulated Moving-Bed Adsorption for Separation of Racemic Mixtures", *Brazilian Journal of Chemical Engineering*, vol. 21, No. 01 2004, 127-136.
Quan, Wenqin et al., "Determination of eicosapentaenoic acid and docosahexaenoic acid in fish oil by high performance liquid chromatography/mass spectrometry", *Food & Machinery*, vol. 24, No. 2, pp. 114-117, Mar. 31, 2008, 4 pages.
Quan, Wenqin, "Study on the enrichment of glyceride of ω-3PUFA", *Chinese Master's Theses Full-text Database Basic Sciences*, A0062-42 Mar. 15, 2009, 77 pages.

* cited by examiner

Figure 10
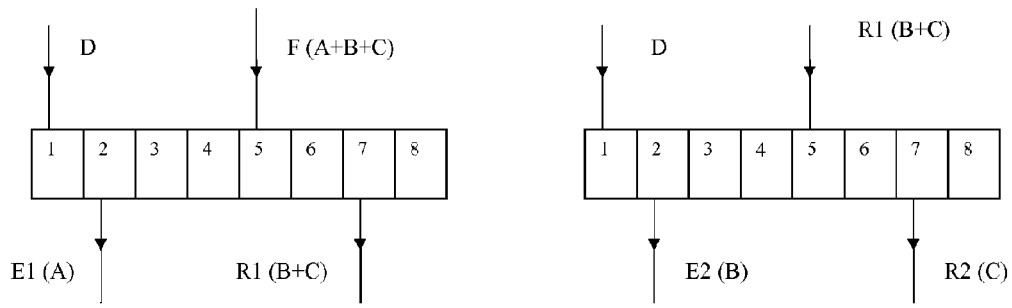
10A
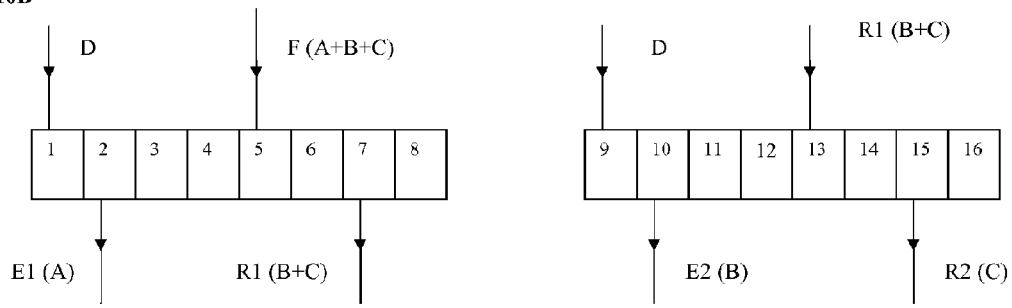
10B
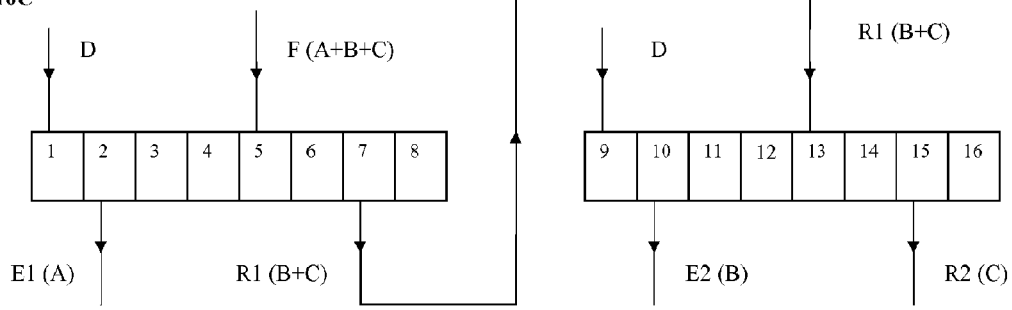
10C
FIRST SEPARATION STEP             SECOND SEPARATION STEP
⟶  FLOW OF ELUENT              ⟶  FLOW OF ELUENT
⟵  FLOW OF ADSORBENT           ⟵  FLOW OF ADSORBENT EPA 55 Feed material

SMB PROCESS

The present invention relates to an improved chromatographic separation process for purifying polyunsaturated fatty acids (PUFAs) and derivatives thereof. In particular, the present invention relates to an improved simulated or actual moving bed chromatographic separation process for purifying PUFAs and derivatives thereof.

BACKGROUND OF THE INVENTION

Fatty acids, in particular PUFAs, and their derivatives are precursors for biologically important molecules, which play an important role in the regulation of biological functions such as platelet aggregation, inflammation and immunological responses. Thus, PUFAs and their derivatives may be therapeutically useful in treating a wide range of pathological conditions including CNS conditions; neuropathies, including diabetic neuropathy; cardiovascular diseases; general immune system and inflammatory conditions, including inflammatory skin diseases.

PUFAs are found in natural raw materials, such as vegetable oils and marine oils. Such PUFAs are, however, frequently present in such oils in admixture with saturated fatty acids and numerous other impurities. PUFAs should therefore desirably be purified before nutritional or pharmaceutical uses.

Unfortunately, PUFAs are extremely fragile. Thus, when heated in the presence of oxygen, they are prone to isomerization, peroxidation and oligomerization. The fractionation and purification of PUFA products to prepare pure fatty acids is therefore difficult. Distillation, even under vacuum, can lead to non-acceptable product degradation.

Simulated and actual moving bed chromatography are known techniques, familiar to those of skill in the art. The principle of operation involves countercurrent movement of a liquid eluent phase and a solid adsorbent phase. This operation allows minimal usage of solvent making the process economically viable. Such separation technology has found several applications in diverse areas, including hydrocarbons, industrial chemicals, oils, sugars and APIs.

As is well known, in a conventional stationary bed chromatographic system, a mixture whose components are to be separated percolates through a container. The container is generally cylindrical, and is typically referred to as the column. The column contains a packing of a porous material (generally called the stationary phase) exhibiting a high permeability to fluids. The percolation velocity of each component of the mixture depends on the physical properties of that component so that the components exit from the column successively and selectively. Thus, some of the components tend to fix strongly to the stationary phase and thus will percolate slowly, whereas others tend to fix weakly and exit from the column more quickly. Many different stationary bed chromatographic systems have been proposed and are used for both analytical and industrial production purposes.

In contrast, a simulated moving bed chromatography apparatus consists of a number of individual columns containing adsorbent which are connected together in series. Eluent is passed through the columns in a first direction. The injection points of the feedstock and the eluent, and the separated component collection points in the system, are periodically shifted by means of a series of valves. The overall effect is to simulate the operation of a single column containing a moving bed of the solid adsorbent, the solid adsorbent moving in a countercurrent direction to the flow of eluent. Thus, a simulated moving bed system consists of columns which, as in a conventional stationary bed system, contain stationary beds of solid adsorbent through which eluent is passed, but in a simulated moving bed system the operation is such as to simulate a continuous countercurrent moving bed.

Processes and equipment for simulated moving bed chromatography are described in several patents, including U.S. Pat. No. 2,985,589, U.S. Pat. No. 3,696,107, U.S. Pat. No. 3,706,812, U.S. Pat. No. 3,761,533, FR-A-2103302, FR-A-2651148 and FR-A-2651149, the entirety of which are incorporated herein by reference. The topic is also dealt with at length in "Preparative and Production Scale Chromatography", edited by Ganetsos and Barker, Marcel Dekker Inc, New York, 1993, the entirety of which is incorporated herein by reference.

An actual moving bed system is similar in operation to a simulated moving bed system. However, rather than shifting the injection points of the feed mixture and the eluent, and the separated component collection points by means of a system of valves, instead a series of adsorption units (i.e. columns) are physically moved relative to the feed and drawoff points. Again, operation is such as to simulate a continuous countercurrent moving bed.

Processes and equipment for actual moving bed chromatography are described in several patents, including U.S. Pat. No. 6,979,402, U.S. Pat. No. 5,069,883 and U.S. Pat. No. 4,764,276, the entirety of which are incorporated herein by reference.

Purification of PUFA products is particularly challenging. Thus, many suitable feedstocks for preparing PUFA products are extremely complex mixtures containing a large number of different components with very similar retention times in chromatography apparatuses. It is therefore very difficult to separate certain PUFAs from such feedstocks. However, a high degree of purity of PUFA products is required, particularly for pharmaceutical and nutraceutical applications. Historically, therefore, distillation has been used when high purity PUFA products are required. There are, however, significant drawbacks to using distillation as a separation technique for delicate PUFAs as discussed above.

As yet, no chromatographic technique has been made available for achieving high purity PUFA products, for example greater than 95 or 97% purity, in particular from commercially available feedstocks such as fish oils.

A typical in a simulated moving bed chromatography apparatus is illustrated with reference to FIG. 1. The concept of a simulated or actual moving bed chromatographic separation process is explained by considering a vertical chromatographic column containing stationary phase S divided into sections, more precisely into four superimposed sub-zones I, II, III and IV going from the bottom to the top of the column. The eluent is introduced at the bottom at IE by means of a pump P. The mixture of the components A and B which are to be separated is introduced at IA+B between sub-zone II and sub-zone III. An extract containing mainly B is collected at SB between sub-zone I and sub-zone II, and a raffinate containing mainly A is collected at SA between sub-zone III and sub-zone IV.

In the case of a simulated moving bed system, a simulated downward movement of the stationary phase S is caused by movement of the introduction and collection points relative to the solid phase. In the case of an actual moving bed system, simulated downward movement of the stationary phase S is caused by movement of the various chromatographic columns relative to the introduction and collection points. In FIG. 1, eluent flows upward and mixture A+B is injected between sub-zone II and sub-zone III. The components will move according to their chromatographic interactions with the stationary phase, for example adsorption on a porous medium. The component B that exhibits stronger affinity to the stationary phase (the slower running component) will be more slowly entrained by the eluent and will follow it with delay. The component A that exhibits the weaker affinity to the stationary phase (the faster running component) will be easily entrained by the eluent. If the right set of parameters, especially the flow rate in each sub-zone, are correctly estimated and controlled, the component A exhibiting the weaker affinity to the stationary phase will be collected between sub-zone III and sub-zone IV as a raffinate and the component B exhibiting the stronger affinity to the stationary phase will be collected between sub-zone I and sub-zone II as an extract.

It will therefore be appreciated that the conventional simulated moving bed system schematically illustrated in FIG. 1 is limited to binary fractionation.

Accordingly, there is a need for a simulated or actual moving bed chromatographic separation process that can separate PUFAs or their derivatives from both faster and slower running components (i.e. more polar and less polar impurities), to produce high purity PUFA products from commercially available feedstocks such as fish oils. It is further desirable that the process should involve inexpensive eluents which operate under standard temperature and pressure conditions.

SUMMARY OF THE INVENTION

It has now been surprisingly found that a PUFA product can be effectively purified from commercially available feedstocks such as fish oils by simulated or actual moving bed apparatus using an aqueous organic solvent eluent. The present invention therefore provides a chromatographic separation process for recovering a polyunsaturated fatty acid (PUFA) product from a feed mixture, which process comprises the steps of:
(i) purifying the feed mixture in a first separation step in a simulated or actual moving bed chromatography apparatus having a plurality of linked chromatography columns containing, as eluent, an aqueous organic solvent, to obtain an intermediate product; and
(ii) purifying the intermediate product obtained in (i) in a second separation step using a simulated or actual moving bed chromatography apparatus having a plurality of linked chromatography columns containing, as eluent, an aqueous organic solvent, to obtain the PUFA product; wherein
(a) the first and second separation steps are carried out sequentially on the same chromatography apparatus, the intermediate product being recovered between the first and second separation steps and the process conditions in the chromatography apparatus being adjusted between the first and second separation steps such that the PUFA product is separated from different components of the feed mixture in each separation step; or
(b) the first and second separation steps are carried out on separate first and second chromatography apparatuses respectively, the intermediate product obtained from the first separation step being introduced into the second chromatography apparatus, and the PUFA product being separated from different components of the feed mixture in each separation step.

Also provided is a PUFA product obtainable by the process of the present invention.

The PUFA products produced by the process of the present invention are produced in high yield, and have high purity. Further, the content of the distinctive impurities which typically arise from distillation of PUFAs is very low. As used herein, the term "isomeric impurities" is used to denote those impurities typically produced during the distillation of PUFA-containing natural oils. These include PUFA isomers, peroxidation and oligomerization products.

DESCRIPTION OF THE FIGURES

FIG. 10 illustrates three ways in which the chromatographic separation process of the invention may be carried out.

DETAILED DESCRIPTION OF THE INVENTION

Figure 1:
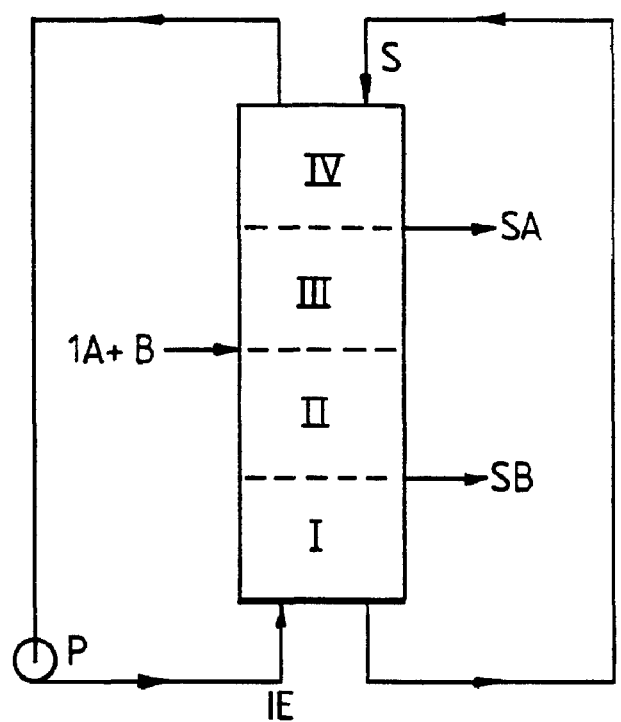
FIG. 1 illustrates the basic principles of a simulated or actual moving bed process for separating a binary mixture.

The chromatographic separation process of the invention is typically other than a chromatographic separation process for recovering a polyunsaturated fatty acid (PUFA) product, from a feed mixture, which process comprises introducing the feed mixture to a simulated or actual moving bed chromatography apparatus having a plurality of linked chromatography columns containing, as eluent, an aqueous alcohol, wherein the apparatus has a plurality of zones comprising at least a first zone and second zone, each zone having an extract stream and a raffinate stream from which liquid can be collected from said plurality of linked chromatography columns, and wherein (a) a raffinate stream containing the PUFA product together with more polar components is collected from a column in the first zone and introduced to a nonadjacent column in the second zone, and/or (b) an extract stream containing the PUFA product together with less polar components is collected from a column in the second zone and introduced to a nonadjacent column in the first zone, said PUFA product being separated from different components of the feed mixture in each zone.

As used herein in this embodiment, the term "zone" refers to a plurality of linked chromatography columns containing, as eluent, an aqueous alcohol, and having one or more injection points for a feed mixture stream, one or more injection points for water and/or alcohol, a raffinate take-off stream from which liquid can be collected from said plurality of linked chromatography columns, and an extract take-off stream from which liquid can be collected from said plurality of linked chromatography columns Typically, each zone has only one injection point for a feed mixture. In one embodiment, each zone has only one injection point for the aqueous alcohol eluent. In another embodiment, each zone has two or more injection points for water and/or alcohol.

Further details of this embodiment are to be found in international patent application no. PCT/GB10/002339, the entirety of which is incorporated herein by reference. The chromatographic separation process of the invention is typically other than the processes disclosed in PCT/GB10/002339.

As used herein, the term "PUFA product" refers to a product comprising one or more polyunsaturated fatty acids (PUFAs), and/or derivatives thereof, typically of nutritional or pharmaceutical significance. Typically, the PUFA product is a single PUFA or derivative thereof. Alternatively, the PUFA product is a mixture of two or more PUFAs or derivatives thereof, for example two.

The term "polyunsaturated fatty acid" (PUFA) refers to fatty acids that contain more than one double bond. Such PUFAs are well known to the person skilled in the art. As used herein, a PUFA derivative is a PUFA in the form of a mono-, di- or tri-glyceride, ester, phospholipid, amide, lactone, or salt. Triglycerides and esters are preferred. Esters are more preferred. Esters are typically alkyl esters, preferably $C_1$-$C_6$ alkyl esters, more preferably $C_1$-$C_4$ alkyl esters. Examples of esters include methyl and ethyl esters. Ethyl esters are most preferred.

Typically, the PUFA product comprises at least one ω-3 or ω-6 PUFA, preferably at least one ω-3 PUFA. Examples of ω-3 PUFAs include alpha-linolenic acid (ALA), stearidonic acid (SDA), eicosatrienoic acid (ETE), eicosatetraenoic acid (ETA), eicosapentaenoic acid (EPA), docosapentaenoic acid (DPA) and docosahexaenoic acid (DHA). SDA, EPA, DPA and DHA are preferred. EPA and DHA are more preferred. Examples of ω-6 PUFAs include linoleic acid (LA), gamma-linolenic acid (GLA), eicosadienoic acid, dihomo-gamma-linolenic acid (DGLA), arachidonic acid (ARA), docosadienoic acid, adrenic acid and docosapentaenoic (ω-6) acid. LA, ARA, GLA and DGLA are preferred.

In one embodiment, the PUFA product is EPA and/or EPA ethyl ester (EE)

In another embodiment, the PUFA product is DHA and/or DHA ethyl ester (EE).

In a yet further embodiment, the PUFA product is a mixture of EPA and DHA and/or EPA EE and DHA EE.

In a most preferred embodiment, the PUFA product is EPA or EPA ethyl ester which is produced in greater than 90% purity, preferably greater than 95% purity, and more preferably greater than 97% purity.

Typically, in addition to said PUFA product, an additional secondary PUFA product is collected in the chromatographic separation process of the invention. Preferably, the PUFA product is EPA and the additional secondary PUFA product is DHA.

In a further embodiment of the invention, the apparatus is configured to collect a PUFA product which is a concentrated mixture of EPA and DHA. Thus, a feed mixture is used which contains EPA, DHA, components which are more polar than EPA and DHA, and components which are less polar than EPA and DHA. In the first separation step, less polar material than EPA and DHA is typically removed. In the second separation step, material which is more polar than EPA and DHA is typically removed, and a concentrated mixture of EPA and DHA is collected as the PUFA product.

Suitable feed mixtures for fractionating by the process of the present invention may be obtained from natural sources including vegetable and animal oils and fats, and from synthetic sources including oils obtained from genetically modified plants, animals and micro organisms including yeasts. Examples include fish oils, algal and microalgal oils and plant oils, for example borage oil, Echium oil and evening primrose oil. In one embodiment, the feed mixture is a fish oil. In another embodiment, the feed mixture is an algal oil. Algal oils are particularly suitable when the desired PUFA product is EPA and/or DHA. Genetically modified Safflower oil is particularly suitable when the desired PUFA product is GLA. Genetically modified yeast is particularly suitable when the desired PUFA product is EPA.

In a particularly preferred embodiment the feed mixture is a fish oil or fish-oil derived feedstock. It has advantageously been found that when a fish-oil or fish-oil derived feed stock is used, an EPA or EPA ethyl ester PUFA product can be produced by the process of the present invention in greater than 90% purity, preferably greater than 95% purity, and more preferably greater than 97% purity.

The feed mixture may undergo chemical treatment before fractionation by the process of the invention. For example, it may undergo glyceride transesterification or glyceride hydrolysis followed in certain cases by selective processes such as crystallisation, molecular distillation, urea fractionation, extraction with silver nitrate or other metal salt solutions, iodolactonisation or supercritical fluid fractionation. Alternatively, a feed mixture may be used directly with no initial treatment step.

The feed mixtures typically contain the PUFA product and at least one more polar component and at least one less polar component. The less polar components have a stronger adherence to the adsorbent used in the process of the present invention than does the PUFA product. During operation, such less polar components typically move with the solid adsorbent phase in preference to the liquid eluent phase. The more polar components have a weaker adherence to the adsorbent used in the process of the present invention than does the PUFA product. During operation, such more polar components typically move with the liquid eluent phase in preference to the solid adsorbent phase. In general, more polar components will be separated into a raffinate stream, and less polar components will be separated into an extract stream.

Examples of the more and less polar components include (1) other compounds occurring in natural oils (e.g. marine oils or vegetable oils), (2) byproducts formed during storage, refining and previous concentration steps and (3) contaminants from solvents or reagents which are utilized during previous concentration or purification steps.

Examples of (1) include other unwanted PUFAs; saturated fatty acids; sterols, for example cholesterol; vitamins; and environmental pollutants, such as polychlorobiphenyl (PCB), polyaromatic hydrocarbon (PAH) pesticides, chlorinated pesticides, dioxines and heavy metals. PCB, PAH, dioxines and chlorinated pesticides are all highly non-polar components.

Examples of (2) include isomers and oxidation or decomposition products from the PUFA product, for instance, auto-oxidation polymeric products of fatty acids or their derivatives.

Examples of (3) include urea which may be added to remove saturated or mono-unsaturated fatty acids from the feed mixture.

Preferably, the feed mixture is a PUFA-containing marine oil (e.g. a fish oil), more preferably a marine oil (e.g. a fish oil) comprising EPA and/or DHA.

A typical feed mixture for preparing concentrated EPA (EE) by the process of the present invention comprises 50-75% EPA (EE), 0 to 10% DHA (EE), and other components including other essential ω-3 and ω-6 fatty acids.

A preferred feed mixture for preparing concentrated EPA (EE) by the process of the present invention comprises 55% EPA (EE), 5% DHA (EE), and other components including other essential ω-3 and ω-6 fatty acids. DHA (EE) is less polar than EPA(EE).

A typical feed mixture for preparing concentrated DHA (EE) by the process of the present invention comprises 50-75% DHA (EE), 0 to 10% EPA (EE), and other components including other essential ω-3 and ω-6 fatty acids.

A preferred feed mixture for preparing concentrated DHA (EE) by the process of the present invention comprises 75% DHA (EE), 7% EPA (EE) and other components including other essential ω-3 and ω-6 fatty acids. EPA (EE) is more polar than DHA (EE).

A typical feed mixture for preparing a concentrated mixture of EPA (EE) and DHA (EE) by the process of the present invention comprises greater than 33% EPA (EE), and greater than 22% DHA (EE).

Each separation step of the process of the present invention is carried out in a simulated or actual moving bed chromatography apparatus.

Any known simulated or actual moving bed chromatography apparatus may be utilised for the purposes of the method of the present invention, as long as the apparatus is used in accordance with the process of the present invention. Those apparatuses described in U.S. Pat. No. 2,985,589, U.S. Pat. No. 3,696,107, U.S. Pat. No. 3,706,812, U.S. Pat. No. 3,761, 533, FR-A-2103302, FR-A-2651148, FR-A-2651149, U.S. Pat. No. 6,979,402, U.S. Pat. No. 5,069,883 and U.S. Pat. No. 4,764,276 may all be used if configured in accordance with the process of the present invention.

As used herein, the term "simulated or actual moving bed chromatography apparatus" typically refers to a plurality of linked chromatography columns containing, as eluent, an aqueous organic solvent, and having one or more injection points for a feed mixture stream, one or more injection points for water and/or organic solvent, a raffinate take-off stream from which liquid can be collected from said plurality of linked chromatography columns, and an extract take-off stream from which liquid can be collected from said plurality of linked chromatography columns.

The chromatography apparatus used in each step of the process of the present invention has a single array of chromatography columns linked in series containing, as eluent, an aqueous organic solvent. Typically, each of the chromatography columns are linked to the two columns in the apparatus adjacent to that column. Thus, the output from a given column in the array is connected to the input of the adjacent column in the array, which is downstream with respect to the flow of eluent in the array. Thus, eluent can flow around the array of linked chromatography columns. Typically, none of the chromatography columns are linked to non-adjacent columns in the apparatus.

As used herein the term "nonadjacent" refers to columns, in for example the same apparatus, separated by one or more columns, preferably 3 or more columns, more preferably 5 or more columns, most preferably about 5 columns.

Typically, each apparatus has only one injection point for a feed mixture. In one embodiment, each apparatus has only one injection point for the aqueous organic solvent eluent. In another embodiment, each apparatus has two or more injection points for water and/or organic solvent.

The term "raffinate" is well known to the person skilled in the art. In the context of actual and simulated moving bed chromatography it refers to the stream of components that move more rapidly with the liquid eluent phase compared with the solid adsorbent phase. Thus, a raffinate stream is typically enriched with more polar components, and depleted of less polar components compared with a feed stream.

The term "extract" is well known to the person skilled in the art. In the context of actual and simulated moving bed chromatography it refers to the stream of components that move more rapidly with the solid adsorbent phase compared with the liquid eluent phase. Thus, an extract stream is typically enriched with less polar components, and depleted of more polar components compared with a feed stream.

The number of columns used in each apparatus is not particularly limited. A skilled person would easily be able to determine an appropriate number of columns to use. The number of columns is typically 4 or more, preferably 6 or more, more preferably 8 or more, for example 4, 5, 6, 7, 8, 9, or 10 columns. In preferred embodiment, 5 or 6 columns, more preferably 6 columns. are used. In another preferred embodiment, 7 or 8 columns, more preferably 8 columns are used. Typically, there are no more than 25 columns, preferably no more than 20, more preferably no more than 15.

The chromatographic apparatuses used in the first and second separation steps typically contain the same number of columns. For certain applications they may have different numbers of columns.

The dimensions of the columns used in the apparatus are not particularly limited, and will depend on the volume of feed mixture to be purified. A skilled person would easily be able to determine appropriately sized columns to use. The diameter of each column is typically between 10 and 1000 mm, preferably between 10 and 500 mm, more preferably between 25 and 250 mm, even more preferably between 50 and 100 mm, and most preferably between 70 and 80 mm. The length of each column is typically between 10 and 300 cm, preferably between 10 and 200 cm, more preferably between 25 and 150 cm, even more preferably between 70 and 110 cm, and most preferably between 80 and 100 cm.

The columns in the chromatographic apparatuses used in the first and second separation steps typically have identical dimensions but may, for certain applications, have different dimensions.

The flow rates to the column are limited by maximum pressures across the series of columns and will depend on the column dimensions and particle size of the solid phases. One skilled in the art will easily be able to establish the required flow rate for each column dimension to ensure efficient desorption. Larger diameter columns will in general need higher flows to maintain linear flow through the columns.

For the typical column sizes outlined above, typically the flow rate of eluent into the chromatographic apparatus used in the first separation step is from 1 to 4.5 L/min, preferably from 1.5 to 2.5 L/min. Typically, the flow rate of the extract from the chromatographic apparatus used in the first separation step is from 0.1 to 2.5 L/min, preferably from 0.5 to 2.25 L/min. In embodiments where part of the extract from the first separation step is recycled back into the apparatus used in the first separation step, the flow rate of recycle is typically from 0.7 to 1.4 L/min, preferably about 1 L/min. Typically, the flow rate of the raffinate from the chromatographic apparatus used in the first separation step is from 0.2 to 2.5 L/min, preferably from 0.3 to 2.0 L/min. In embodiments where part of the raffinate from the first separation step is recycled back into the apparatus used in the first separation step, the flow rate of recycle is typically from 0.3 to 1.0 L/min, preferably about 0.5 L/min. Typically, the flow rate of introduction of the feed mixture into the chromatographic apparatus used in the first separation step is from 5 to 150 mL/min, preferably from 10 to 100 mL/min, more preferably from 20 to 60 mL/min.

For the typical column sizes outlined above, typically the flow rate of eluent into the chromatographic apparatus used in the second separation step is from 1 to 4 L/min, preferably from 1.5 to 3.5 L/min. Typically, the flow rate of the extract from the chromatographic apparatus used in the second separation step is from from 0.5 to 2 L/min, preferably from 0.7 to 1.9 L/min. In embodiments where part of the extract from the second separation step is recycled back into the apparatus used in the second separation step, the flow rate of recycle is typically from 0.6 to 1.4 L/min, preferably from 0.7 to 1.1 L/min, more preferably about 0.9 L/min. Typically, the flow rate of the raffinate from the chromatographic apparatus used in the second separation step is from 0.5 to 2.5 L/min, preferably from 0.7 to 1.8 L/min, more preferably about 1.4 L/min. In embodiments where part of the raffinate from the second separation step is recycled back into the apparatus used in the second separation step, the flow rate of recycle is typically from 0.3 to 1.0 L/min, preferably about 0.5 L/min.

As the skilled person will appreciate, references to rates at which liquid is collected or removed via the various extract and raffinate streams refer to volumes of liquid removed in an amount of time, typically L/minute. Similarly, references to rates at which liquid is recycled back into an apparatus, typically to an adjacent column in the apparatus, refer to volumes of liquid recycled in an amount of time, typically L/minute.

The step time, i.e. the time between shifting the points of injection of the feed mixture and eluent, and the various take off points of the collected fractions, is not particularly limited, and will depend on the number and dimensions of the columns used, and the flow rate through the apparatus. A skilled person would easily be able to determine appropriate step times to use in the process of the present invention. The step time is typically from 100 to 1000 seconds, preferably from 200 to 800 seconds, more preferably from about 250 to about 750 seconds. In some embodiments, a step time of from 100 to 400 seconds, preferably 200 to 300 seconds, more preferably about 250 seconds, is appropriate. In other embodiments, a step time of from 600 to 900 seconds, preferably 700 to 800 seconds, more preferably about 750 seconds is appropriate.

In the process of the present invention, actual moving bed chromatography is preferred.

Conventional adsorbents known in the art for actual and simulated moving bed systems may be used in the process of the present invention. Each chromatographic column may contain the same or a different adsorbent. Typically, each column contains the same adsorbent. Examples of such commonly used materials are polymeric beads, preferably polystyrene reticulated with DVB (divinylbenzene); and silica gel, preferably reverse phase bonded silica gel with C8 or C18 alkanes, especially C18. C18 bonded reverse phase silica gel is preferred. The adsorbent used in the process of the present invention is preferably non-polar.

The shape of the adsorbent stationary phase material may be, for example, spherical or nonspherical beads, preferably substantially spherical beads. Such beads typically have a diameter of 5 to 500 microns, preferably 10 to 500 microns, more preferably 15 to 500 microns, more preferably 40 to 500 microns, more preferably 100 to 500 microns, more preferably 250 to 500 microns, even more preferably 250 to 400 microns, most preferably 250 to 350 microns. In some embodiments, beads with a diameter of 5 to 35 microns may be used, typically 10 to 30 microns, preferably 15 to 25 microns. Some preferred particle sizes are somewhat larger than particle sizes of beads used in the past in simulated and actual moving bed processes. Use of larger particles enables a lower pressure of eluent to be used in the system. This, in turn, has advantages in terms of cost savings, efficiency and lifetime of the apparatus. It has surprisingly been found that adsorbent beads of large particle size may be used in the process of the present invention (with their associated advantages) without any loss in resolution.

The adsorbent typically has a pore size of from 10 to 50 nm, preferably 15 to 45 nm, more preferably 20 to 40 nm, most preferably 25 to 35 nm.

Typically, the process of the present invention is conducted at from 15 to 55° C., preferably at from 20 to 40° C., more preferably at about 30° C. Thus, the process is typically carried out at room temperature, but may be conducted at elevated temperatures.

The process of the present invention comprises a first and second separation step.

These two steps can easily be carried out on a single chromatographic apparatus. Thus, in one embodiment, (a) the first and second separation steps are carried out sequentially on the same chromatography apparatus, the intermediate product being recovered between the first and second separation steps and the process conditions in the chromatography apparatus being adjusted between the first and second separation steps such that the PUFA product is separated from different components of the feed mixture in each separation step. A preferred embodiment of this separation process is shown as FIG. 10a. Thus, the first separation step (left hand side) is carried out on an SMB apparatus having 8 columns. Between the first and second separation steps the intermediate product is recovered in, for example, a container, the process conditions in the chromatography apparatus are adjusted such that the PUFA product is separated from different components of the feed mixture in each separation step. The second separation step (right hand side) is then carried out on the same SMB apparatus having 8 columns.

In embodiment (a), adjusting the process conditions typically refers to adjusting the process conditions in the apparatus as a whole, i.e. physically modifying the apparatus so that the conditions are different. It does not refer to simply reintroducing the intermediate product back into a different part of the same apparatus where the process conditions might happen to be different.

Alternatively, first and second separate chromatographic apparatuses can be used in the first and second separation steps. Thus, in another embodiment, (b) the first and second separation steps are carried out on separate first and second chromatography apparatuses respectively, the intermediate product obtained from the first separation step being introduced into the second chromatography apparatus, and the PUFA product being separated from different components of the feed mixture in each separation step.

In embodiment (b), the two separation steps may either be carried out sequentially or simultaneously.

Thus, in embodiment (b) in the case where the two separation steps are carried out sequentially, the first and second separation steps are carried out sequentially on separate first and second chromatography apparatuses respectively, the intermediate product being recovered between the first and second separation steps and the process conditions in the first and second chromatography apparatuses being adjusted such that the PUFA product is separated from different components of the feed mixture in each separation step. A preferred embodiment of this separation process is shown as FIG. 10b. Thus, the first separation step (left hand side) is carried out on an SMB apparatus having 8 columns, one to eight. Between the first and second separation steps the intermediate product is recovered, for example in a container, and then introduced into a second separate SMB apparatus. The second separation step (right hand side) is carried out on the second separate SMB apparatus which has 8 columns, nine to sixteen. The process conditions in the two chromatography apparatuses are adjusted such that the PUFA product is separated from different components of the feed mixture in each separation step.

In embodiment (b) in the case where the two separation steps are carried our simultaneously, the first and second separation steps are carried out on separate first and second chromatography apparatuses respectively, the intermediate product being introduced into the chromatography apparatus used in the second separation step, and the process conditions in the first and second chromatography apparatuses being adjusted such that the PUFA product is separated from different components of the feed mixture in each separation step. A preferred embodiment of this separation process is shown as FIG. 10c. Thus, the first separation step (left hand side) is carried out on an SMB apparatus having 8 columns, one to eight. The intermediate product obtained in the first separation step is then introduced into the second separate chromatography apparatus used in the second separation step. The intermediate product may be passed from the first separation step to the second separation step directly or indirectly, for example via a container. The second separation step (right hand side) is carried out on the second separate SMB apparatus which has 8 columns, nine to sixteen. The process conditions in the two chromatography apparatuses are adjusted such that the PUFA product is separated from different components of the feed mixture in each separation step.

In embodiment (b) in the case where the two separation steps are carried our simultaneously, eluent circulates separately in the two separate chromatographic apparatuses. Thus, eluent is not shared between the two separate chromatographic apparatuses other than what eluent may be present as solvent in the intermediate product which is purified in the second separation step, and which is introduced into the chromatographic apparatus used in the second separation step. Chromatographic columns are not shared between the two separate chromatographic apparatuses used in the first and second separation steps.

After the intermediate product is obtained in the first separation step, the aqueous organic solvent eluent may be partly or totally removed before the intermediate product is purified in the second separation step. Alternatively, the intermediate product may be purified in the second separation step without the removal of any solvent present.

As mentioned above, the PUFA product is separated from different components of the feed mixture in each separation step. In embodiment (a), the process conditions of the single SMB apparatus used in both separation steps are adjusted between the first and second separation steps such that the PUFA product is separated from different components of the feed mixture in each separation step. In embodiment (b), the process conditions in the two separate chromatography apparatuses used in the first and second separation steps are set such that the PUFA product is separated from different components of the feed mixture in each separation step.

Thus, the process conditions in the first and second separation steps vary. The process conditions which vary may include, for example, the size of the columns used, the number of columns used, the packing used in the columns, the step time of the SMB apparatus, the temperature of the apparatus, or the flow rates used in the apparatus, in particular the recycle rate of liquid collected via the extract or raffinate streams.

The intermediate product obtained in the first separation step is typically enriched in the PUFA product compared to the feed mixture.

The intermediate product obtained in the first separation step is then introduced into the chromatographic apparatus used in the second separation step.

The intermediate product is typically collected as the raffinate or extract stream from the chromatographic apparatus used in the first separation process.

Typically, the intermediate product is collected as the raffinate stream in the first separation step, and the PUFA product is collected as the extract stream in the second separation step. Thus, the raffinate stream collected in the first separation step is used as the feed mixture in the second separation step. The raffinate stream collected in the first separation step typically contains the PUFA product together with more polar components.

Alternatively, the intermediate product is collected as the extract stream in the first separation step, and the PUFA product is collected as the raffinate stream in the second separation step. Thus, the extract stream collected in the first separation step is used as the feed mixture in the second separation step. The extract stream collected in the first separation step typically contains the PUFA product together with less polar components.

The PUFA product is separated from different components of the feed mixture in each separation step. Typically, the components separated in each separation step of the process of the present invention have different polarities.

Preferably, the PUFA product is separated from less polar components of the feed mixture in the first separation step, and the PUFA product is separated from more polar components of the feed mixture in the second separation step.

Typically, (a) part of the extract stream from the apparatus used in the first separation step is recycled back into the apparatus used in the first separation step; and/or (b) part of the raffinate stream from the apparatus used in the first separation step is recycled back into the apparatus used in the first separation step; and/or (c) part of the extract stream from the apparatus used in the second separation step is recycled back into the apparatus used in the second separation step; and/or (d) part of the raffinate stream from the apparatus used in the second separation step is recycled back into the apparatus used in the second separation step.

Preferably, (a) part of the extract stream from the apparatus used in the first separation step is recycled back into the apparatus used in the first separation step; and (b) part of the raffinate stream from the apparatus used in the first separation step is recycled back into the apparatus used in the first separation step; and (c) part of the extract stream from the apparatus used in the second separation step is recycled back into the apparatus used in the second separation step; and (d) part of the raffinate stream from the apparatus used in the second separation step is recycled back into the apparatus used in the second separation step.

This recycle involves feeding part of the extract or raffinate stream out of the chromatography apparatus used in the first or second separation step back into the apparatus used in that step, typically into an adjacent column. This adjacent column is the adjacent column which is downstream with respect to the flow of eluent in the system.

The rate at which liquid collected via the extract or raffinate stream in the first or second separation steps is recycled back into the chromatography apparatus used in that step is the rate at which liquid collected via that stream is fed back into the apparatus used in that step, typically into an adjacent column, i.e. the downstream column with respect to the flow of eluent in the system.

Figure 9:
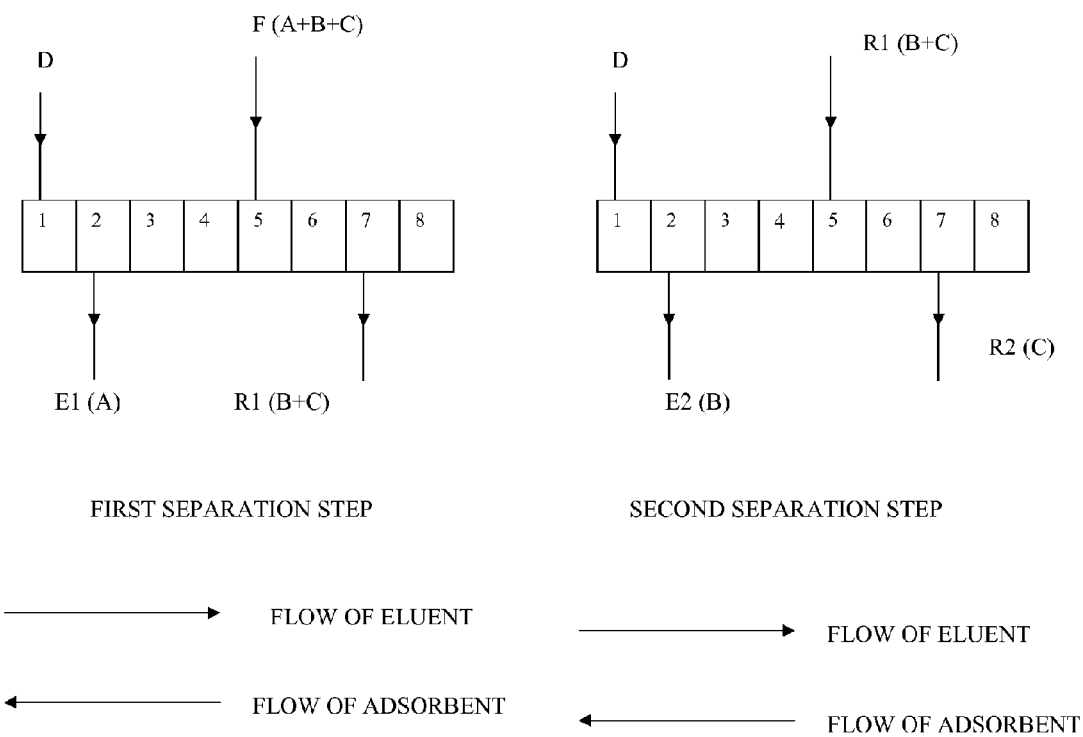
FIG. 9 illustrates an alternative method for a particularly preferred embodiment of the invention for purifying EPA from faster and slower running components (i.e. more polar and less polar impurities).

This can be seen with reference to a preferred embodiment in FIG. 9. The rate of recycle of extract in the first separation step is the rate at which extract collected from the bottom of column 2 of the chromatographic apparatus used in the first separation step is fed into the top of column 3 of the chromatographic apparatus used in the first separation step, i.e. the flow rate of liquid into the top of column 3 of the chromatographic apparatus used in the first separation step.

The rate of recycle of extract in the second separation step is the rate at which extract collected at the bottom of column 2 of the chromatographic apparatus used in the second separation step is fed into the top of column 3 of the chromatographic apparatus used in the second separation step, i.e. the flow rate of liquid into the top of column 3 of the chromatographic apparatus used in the second separation step.

Recycle of the extract and/or raffinate streams in the first and/or second separation steps is typically effected by feeding the liquid collected via that stream in that separation step into a container, and then pumping an amount of that liquid from the container back into the apparatus used in that separation step, typically into an adjacent column. In this case, the rate of recycle of liquid collected via a particular extract or raffinate stream in the first and/or second separation steps, typically back into an adjacent column, is the rate at which liquid is pumped out of the container back into the chromatography apparatus, typically into an adjacent column.

As the skilled person will appreciate, the amount of liquid being introduced into a chromatography apparatus via the eluent and feedstock streams is balanced with the amount of liquid removed from the apparatus, and recycled back into the apparatus.

Thus, with reference to FIG. 9, for the extract stream, the flow rate of eluent (desorbent) into the chromatographic apparatus(es) used in the first and second separation steps (D) is equal to the rate at which liquid collected via the extract stream in that separation step accumulates in a container (E1 and E2) added to the rate at which extract is recycled back into the chromatographic apparatus used in that particular separation step (D-E1 and D-E2).

For the raffinate stream from a separation step, the rate at which extract is recycled back into the chromatographic apparatus used in that particular separation step (D-E1 and D-E2) added to the rate at which feedstock is introduced into the chromatographic apparatus used in that particular separation step (F and R1) is equal to the rate at which liquid collected via the raffinate stream in that particular separation step accumulates in a container (R1 and R2) added to the rate at which raffinate is recycled back into the chromatographic apparatus used in that particular separation step (D+F-E1-R1 and D+R1-E2-R2).

The rate at which liquid collected from a particular extract or raffinate stream from a chromatography apparatus accumulates in a container can also be thought of as the net rate of removal of that extract or raffinate stream from that chromatography apparatus.

Typically, the rate at which liquid collected via the extract and raffinate streams in the first separation step is recycled back into the apparatus used in that separation step is adjusted such that the PUFA product can be separated from different components of the feed mixture in each separation step.

Typically, the rate at which liquid collected via the extract and raffinate streams in the second separation step is recycled back into the apparatus used in that separation step is adjusted such that the PUFA product can be separated from different components of the feed mixture in each separation step.

Preferably, the rate at which liquid collected via the extract and raffinate streams in each separation step is recycled back into the apparatus used in that separation step is adjusted such that the PUFA product can be separated from different components of the feed mixture in each separation step.

Typically, the rate at which liquid collected via the extract stream in the first separation step is recycled back into the chromatography apparatus used in the first separation step differs from the rate at which liquid collected via the extract stream in the second separation step is recycled back into the chromatography apparatus used in the second separation step, and/or the rate at which liquid collected via the raffinate stream in the first separation step is recycled back into the chromatography apparatus used in the first separation step differs from the rate at which liquid collected via the raffinate stream in the second separation step is recycled back into the chromatography apparatus used in the second separation step.

Varying the rate at which liquid collected via the extract and/or raffinate streams in the first or second separation steps is recycled back into the apparatus used in that particular separation step has the effect of varying the amount of more polar and less polar components present in the extract and raffinate streams. Thus, for example, a lower extract recycle rate results in fewer of the less polar components in that separation step being carried through to the raffinate stream. A higher extract recycle rate results in more of the less polar components in that separation step being carried through to the raffinate stream.

Figure 6:
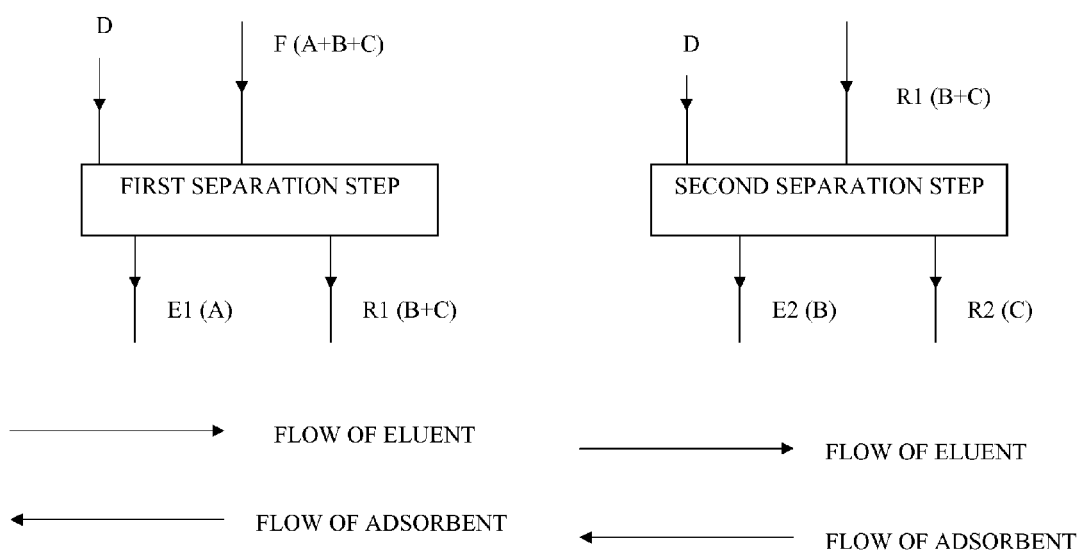
FIG. 6 illustrates in more detail an alternative method for the first preferred embodiment of the invention which is suitable for separating EPA from faster and slower running components (i.e. more polar and less polar impurities).

This can be seen, for example, in the specific embodiment of the invention shown in FIG. 6. The rate at which liquid collected via the extract stream in the first separation step is recycled back into the chromatographic apparatus used in that separation step (D-E1) will affect to what extent any of component A is carried through to the raffinate stream in the first separation step (R1).

Typically, the rate at which liquid collected via the extract stream in the first separation step is recycled back into the chromatographic apparatus used in the first separation step is faster than the rate at which liquid collected via the extract stream in the second separation step is recycled back into the chromatographic apparatus used in the second separation step. Preferably, a raffinate stream containing the PUFA product together with more polar components is collected from the first separation step and purified in a second separation step, and the rate at which liquid collected via the extract stream in the first separation step is recycled back into the chromatographic apparatus used in the first separation step is faster than the rate at which liquid collected via the extract stream in the second separation step is recycled back into the chromatographic apparatus used in the second separation step.

Alternatively, the rate at which liquid collected via the extract stream in the first separation step is recycled back into the chromatographic apparatus used in the first separation step is slower than the rate at which liquid collected via the extract stream in the second separation step is recycled back into the chromatographic apparatus used in the second separation step.

Typically, the rate at which liquid collected via the raffinate stream in the first separation step is recycled back into the chromatographic apparatus used in the first separation step is faster than the rate at which liquid collected via the raffinate stream in the second separation step is recycled back into the chromatographic apparatus used in the second separation step. Preferably, an extract stream containing the PUFA product together with less polar components is collected from the first separation step and purified in a second separation step, and the rate at which liquid collected via the raffinate stream in the first separation step is recycled back into the chromatographic apparatus used in the first separation step is faster than the rate at which liquid collected via the raffinate stream in the second separation step is recycled back into the chromatographic apparatus used in the second separation step.

Alternatively, the rate at which liquid collected via the raffinate stream in the first separation step is recycled back into the chromatographic apparatus used in the first separation step is slower than the rate at which liquid collected via the raffinate stream in the second separation step is recycled back into the chromatographic apparatus used in the second separation step.

In embodiments where recycle rates are adjusted such that the PUFA product can be separated from different components of the feed mixture in each separation step, the water:organic solvent ratio of the eluents used in each separation step may be the same or different. Typically, the water:organic solvent ratio of the eluent in each separation step is from 0.5:99.5 to 5.5:94.5 parts by volume.

The eluent used in the process of the present invention is an aqueous organic solvent.

The aqueous organic solvent typically comprises water and one or more alcohols, ethers, esters, ketones or nitriles, or mixtures thereof.

Alcohol solvents are well known to the person skilled in the art. Alcohols are typically short chain alcohols. Alcohols typically are of formula ROH, wherein R is a straight or branched $C_1$-$C_6$ alkyl group. The $C_1$-$C_6$ alkyl group is preferably unsubstituted. Examples of alcohols include methanol, ethanol, n-propanol, i-propanol, n-butanol, i-butanol, s-butanol and t-butanol. Methanol and ethanol are preferred. Methanol is more preferred.

Ether solvents are well known to the person skilled in the art. Ethers are typically short chain ethers. Ethers typically are of formula R—O—R', wherein R and R' are the same or different and represent a straight or branched $C_1$-$C_6$ alkyl group. The $C_1$-$C_6$ alkyl group is preferably unsubstituted. Preferred ethers include diethylether, diisopropylether, and methyl t-butyl ether (MTBE).

Ester solvents are well known to the person skilled in the art. Esters are typically short chain esters. Esters typically are of formula R—(C=O)O—R', wherein R and R' are the same or different and represent a straight or branched $C_1$-$C_6$ alkyl group. Preferred esters include methylacetate and ethylacetate.

Ketone solvents are well known to the person skilled in the art. Ketones are typically short chain ketones. Ketones typically are of formula R—(C=O)—R', wherein R and R' are the same or different and represent a straight or branched $C_1$-$C_6$ alkyl group. The $C_1$-$C_6$ alkyl group is preferably unsubstituted. Preferred ketones include acetone, methylethylketone and methyl isobutyl ketone (MIBK).

Nitrile solvents are well known to the person skilled in the art. Nitriles are typically short chain nitriles. Nitriles typically are of formula R—CN, wherein R represents a straight or branched $C_1$-$C_6$ alkyl group. The $C_1$-$C_6$ alkyl group is preferably unsubstituted. Preferred nitriles include acetonitrile.

Typically, the aqueous organic solvent is aqueous alcohol or aqueous acetonitrile.

The aqueous organic solvent is preferably aqueous methanol or aqueous acetonitrile. Aqueous methanol is more preferred.

Typically, the eluent is not in a supercritical state. Typically, the eluent is a liquid.

Typically, the average water:organic solvent ratio, for example water:methanol ratio, of the eluent in the entire apparatus is from 0.1:99.9 to 9:91 parts by volume, preferably from 0.25:99.75 to 7:93 parts by volume, more preferably from 0.5:99.5 to 6:94 parts by volume.

When the aqueous organic solvent is aqueous acetonitrile, the eluent typically contains up to 30 wt % water, remainder acetonitrile. Preferably, the eluent contains from 5 to 25 wt % water, remainder acetonitrile. More preferably, the eluent contains from 10 to 20 wt % water, remainder acetonitrile. Even more preferably, the eluent contains from 15 to 25 wt % water, remainder acetonitrile.

In a particularly preferred embodiment, either (1) the intermediate product containing the PUFA product together with more polar components is collected as the raffinate stream in the first separation step, and the PUFA product is collected as the extract stream in the second separation step; or (2) the intermediate product containing the PUFA product together with less polar components is collected as the extract stream in the first separation step, and the PUFA product is collected as the raffinate stream in the second separation step.

Particularly preferred embodiment (1) is suitable for purifying EPA from a feed mixture.

Figure 2:
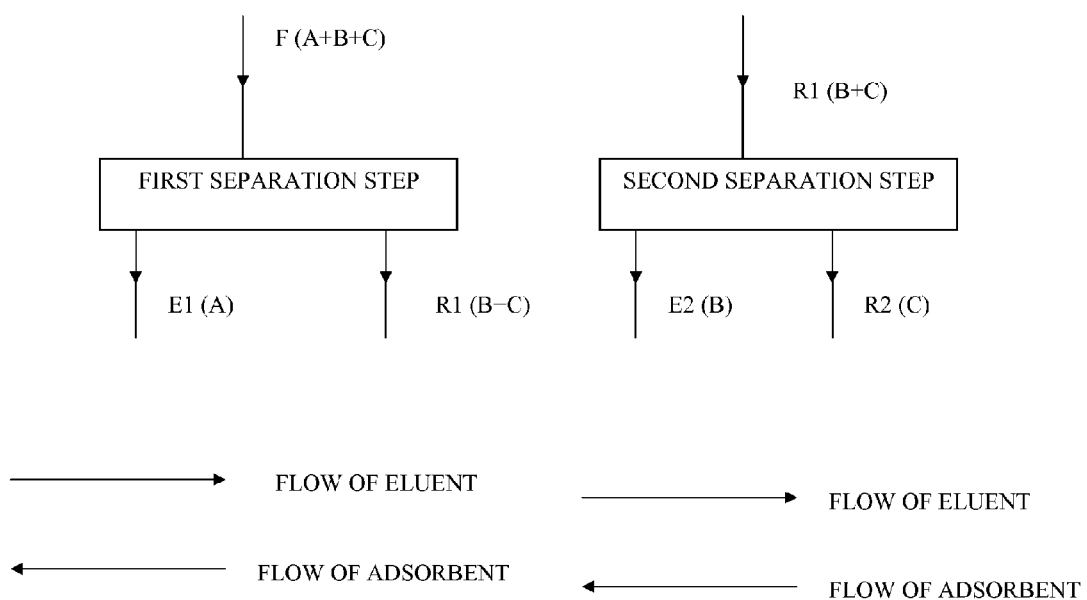
FIG. 2 illustrates a first preferred embodiment of the invention which is suitable for separating EPA from faster and slower running components (i.e. more polar and less polar impurities).

This particularly preferred embodiment (1) is illustrated in FIG. 2. A feed mixture F comprising the PUFA product (B) and more polar (C) and less polar (A) components is purified in the first separation step. In the first separation step, the less polar components (A) are removed as extract stream E1. The PUFA product (B) and more polar components (C) are collected as raffinate stream R1. Raffinate stream R1 is the intermediate product which is then purified in the second separation step. In the second separation step, the more polar components (C) are removed as raffinate stream R2. The PUFA product (B) is collected as extract stream E2.

Figure 4:
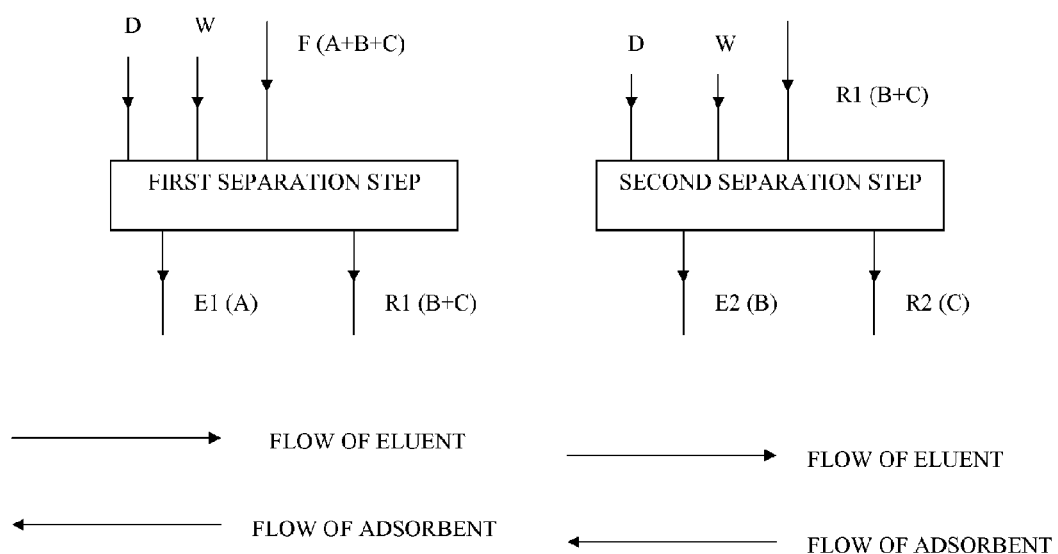
FIG. 4 illustrates in more detail the first preferred embodiment of the invention which is suitable for separating EPA from faster and slower running components (i.e. more polar and less polar impurities).

This embodiment is illustrated in more detail in FIG. 4. FIG. 4 is identical to FIG. 2, except that the points of introduction of the organic solvent desorbent (D) and water (W) into each chromatographic apparatus are shown. The organic solvent desorbent (D) and water (W) together make up the eluent. The (D) phase is typically essentially pure organic solvent, but may, in certain embodiments be an organic solvent/water mixture comprising mainly organic solvent. The (W) phase is typically essentially pure water, but may, in certain embodiments be an organic solvent/water mixture comprising mainly water, for example a 98% water/2% methanol mixture.

A further illustration of this particularly preferred embodiment is shown in FIG. 6. Here there is no separate water injection point, and instead an aqueous organic solvent desorbent is injected at (D).

The separation into raffinate and extract stream can be aided by varying the desorbing power of the eluent within each chromatographic apparatus. This can be achieved by introducing the organic solvent (or organic solvent rich) component of the eluent and the water (or water rich) component at different points in each chromatographic apparatus. Thus, typically, the organic solvent is introduced upstream of the extract take-off point and the water is introduced between the extract take-off point and the point of introduction of the feed into the chromatographic apparatus, relative to the flow of eluent in the system. This is shown in FIG. 4.

Typical solvents for use in this most preferred embodiment are aqueous alcohols or aqueous acetonitrile, preferably aqueous methanol.

The separation can be aided by varying the rates at which liquid collected via the extract and raffinate streams in the first and second separation steps is recycled back into the chromatographic apparatus used in that separation step.

Typically, in this particularly preferred embodiment, the rate at which liquid collected via the extract stream in the first separation step is recycled back into the chromatographic apparatus used in the first separation step is faster than the rate at which liquid collected via the extract stream in the second separation step is recycled back into the chromatographic apparatus used in the second separation step.

In this particularly preferred embodiment the first raffinate stream in the first separation step is typically removed downstream of the point of introduction of the feed mixture into the chromatographic apparatus used in the first separation step, with respect to the flow of eluent.

In this particularly preferred embodiment, the first extract stream in the first separation step is typically removed upstream of the point of introduction of the feed mixture into the chromatographic apparatus used in the first separation step, with respect to the flow of eluent.

In this particularly preferred embodiment, the second raffinate stream in the second separation step is typically removed downstream of the point of introduction of the intermediate product into the chromatographic apparatus used in the second separation step, with respect to the flow of eluent.

In this particularly preferred embodiment, the second extract stream in the second separation step is typically collected upstream of the point of introduction of the intermediate product into the chromatographic apparatus used in the second separation step, with respect to the flow of eluent.

Typically in this particularly preferred embodiment, the organic solvent or aqueous organic solvent is introduced into the chromatographic apparatus used in the first separation step upstream of the point of removal of the first extract stream, with respect to the flow of eluent.

Typically in this particularly preferred embodiment, when water is introduced into the chromatographic apparatus used in the first separation step, the water is introduced into the chromatographic apparatus used in the first separation step upstream of the point of introduction of the feed mixture but downstream of the point of removal of the first extract stream, with respect to the flow of eluent.

Typically in this particularly preferred embodiment, the organic solvent or aqueous organic solvent is introduced into the chromatographic apparatus used in the second separation step upstream of the point of removal of the second extract stream, with respect to the flow of eluent.

Typically in this particularly preferred embodiment, when water is introduced into the chromatographic apparatus used in the second separation step, the water is introduced into the chromatographic apparatus used in the second separation step upstream of the point of introduction of the intermediate product but downstream of the point of removal of the second extract stream, with respect to the flow of eluent.

Particularly preferred embodiment (2) is suitable for purifying DHA from a feed mixture.

Figure 3:
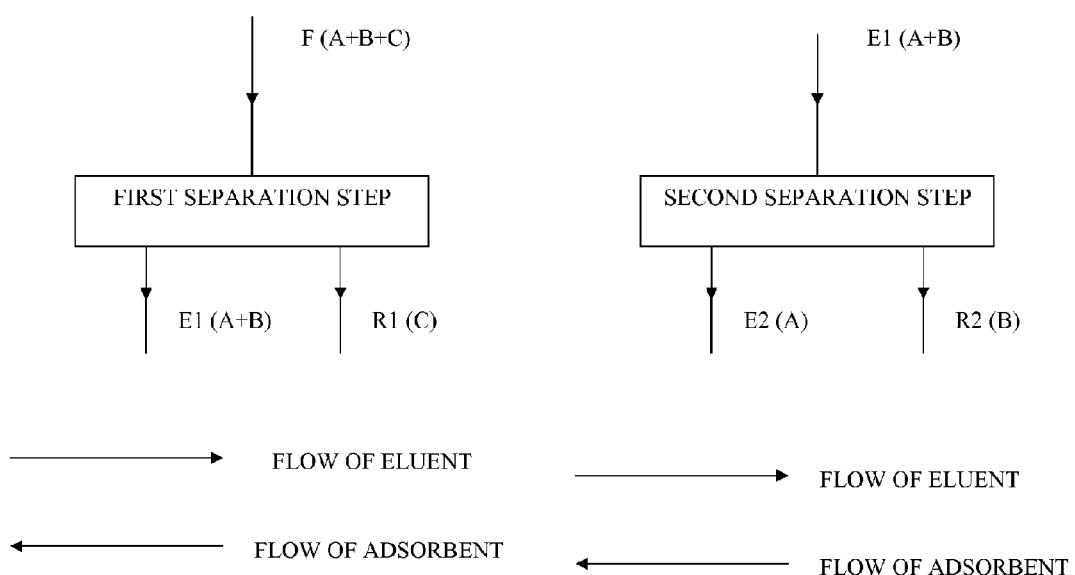
FIG. 3 illustrates a second preferred embodiment of the invention which is suitable for separating DHA from faster and slower running components (i.e. more polar and less polar impurities).

Particularly preferred embodiment (2) is illustrated in FIG. 3. A feed mixture F comprising the PUFA product (B) and more polar (C) and less polar (A) components is purified in the first separation step. In the first separation step, the more polar components (C) are removed as raffinate stream R1. The PUFA product (B) and less polar components (A) are collected as extract stream E1. Extract stream E1 is the intermediate product which is then purified in the second separation step. In the second separation step, the less polar components (A) are removed as extract stream E2. The PUFA product (B) is collected as raffinate stream R2.

Figure 5:
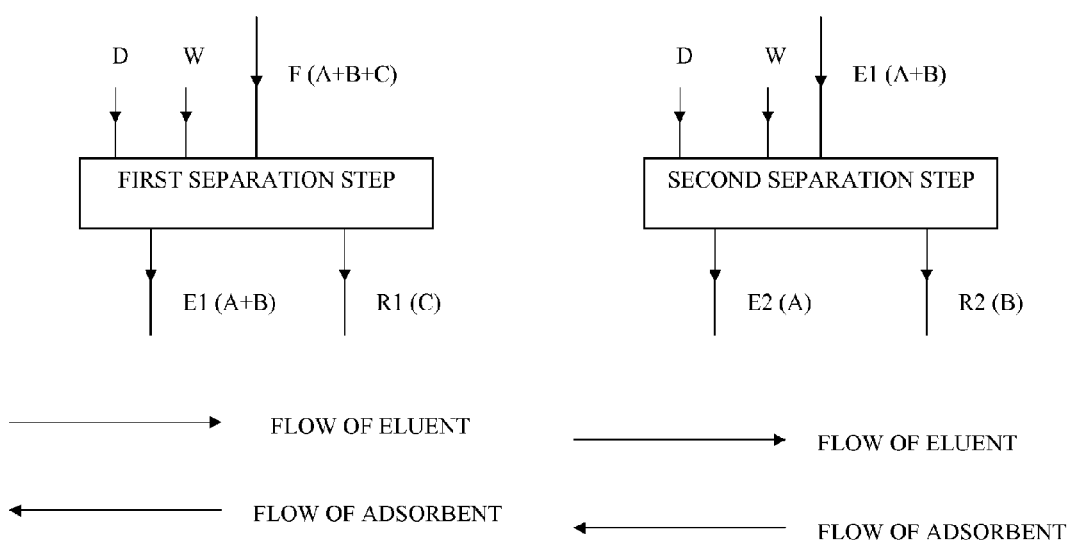
FIG. 5 illustrates in more detail the second preferred embodiment of the invention which is suitable for separating DHA from faster and slower running components (i.e. more polar and less polar impurities).

This embodiment is illustrated in more detail in FIG. 5. FIG. 5 is identical to FIG. 3, except that the points of introduction of the organic solvent desorbent (D) and water (W) into each chromatographic apparatus are shown. As above, the (D) phase is typically essentially pure organic solvent, but may, in certain embodiments be an organic solvent/water mixture comprising mainly organic solvent. The (W) phase is typically essentially pure water, but may, in certain embodiments be an organic solvent/water mixture comprising mainly water, for example a 98% water/2% methanol mixture.

Figure 7:
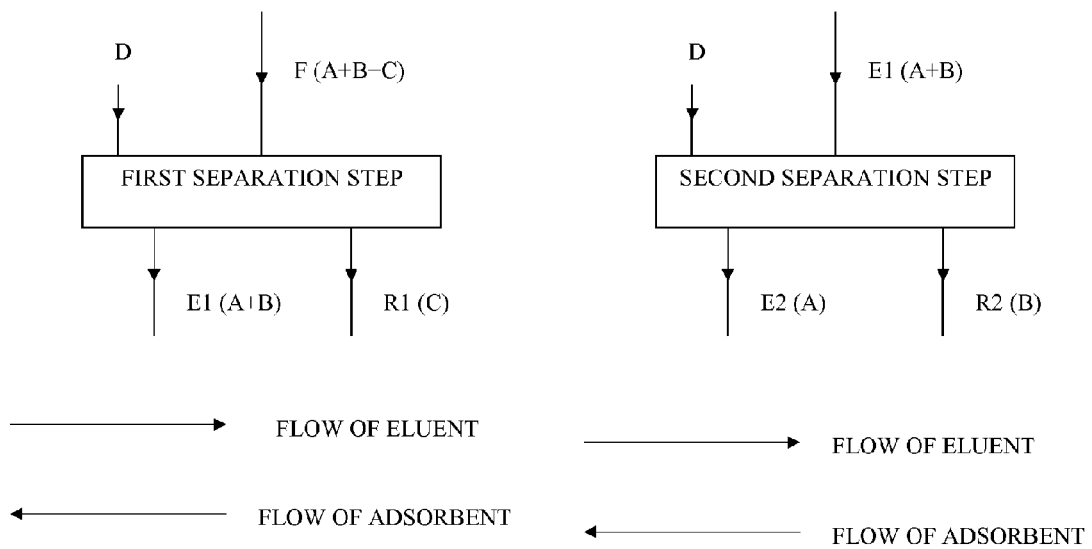
FIG. 7 illustrates in more detail an alternative method for the second preferred embodiment of the invention which is suitable for separating DHA from faster and slower running components (i.e. more polar and less polar impurities).

A further illustration of this particularly preferred embodiment is shown in FIG. 7. Here there is no separate water injection point, and instead an aqueous organic solvent desorbent is injected at (D).

Typical solvents for use in this most preferred embodiment are aqueous alcohols or aqueous acetonitrile, preferably aqueous methanol.

Typically in this embodiment, the rate at which liquid collected via the raffinate stream in the first separation step is reintroduced into the chromatographic apparatus used in the first separation step is faster than the rate at which liquid collected via the raffinate stream in the second separation step is reintroduced into the chromatographic apparatus used in the second separation step.

In this embodiment the first raffinate stream in the first separation step is typically removed downstream of the point of introduction of the feed mixture into the chromatographic apparatus used in the first separation step, with respect to the flow of eluent.

In this embodiment, the first extract stream in the first separation step is typically removed upstream of the point of introduction of the feed mixture into the chromatographic apparatus used in the first separation step, with respect to the flow of eluent.

In this embodiment, the second raffinate stream in the second separation step is typically removed downstream of the point of introduction of the intermediate product into the chromatographic apparatus used in the second separation step, with respect to the flow of eluent.

In this embodiment, the second extract stream in the second separation step is typically collected upstream of the point of introduction of the intermediate product into the chromatographic apparatus used in the second separation step, with respect to the flow of eluent.

Typically in this embodiment, the organic solvent or aqueous organic solvent is introduced into the chromatographic apparatus used in the first separation step upstream of the point of removal of the first extract stream, with respect to the flow of eluent.

Typically in this embodiment, when water is introduced into the chromatographic apparatus used in the first separation step, the water is introduced into the chromatographic apparatus used in the first separation step upstream of the point of introduction of the feed mixture but downstream of the point of removal of the first extract stream, with respect to the flow of eluent.

Typically in this embodiment, the organic solvent or aqueous organic solvent is introduced into the chromatographic apparatus used in the second separation step upstream of the point of removal of the second extract stream, with respect to the flow of eluent.

Typically in this embodiment, when water is introduced into the chromatographic apparatus used in the second separation step, the water is introduced into the chromatographic apparatus used in the second separation step upstream of the point of introduction of the intermediate product but downstream of the point of removal of the second extract stream, with respect to the flow of eluent.

In a preferred embodiment of the invention, each of the simulated or actual moving bed chromatography apparatus used in the first and second separation steps consist of eight chromatographic columns. These are referred to as columns 1 to 8. In each apparatus the eight columns are arranged in series so that the bottom of column 1 is linked to the top of column 2, the bottom of column 2 is linked to the top of column 3 . . . etc. . . . and the bottom of column 8 is linked to the top of column 1. These linkages may optionally be via a holding container, with a recycle stream into the next column. The flow of eluent through the system is from column 1 to column 2 to column 3 etc. The effective flow of adsorbent through the system is from column 8 to column 7 to column 6 etc.

Figure 8:
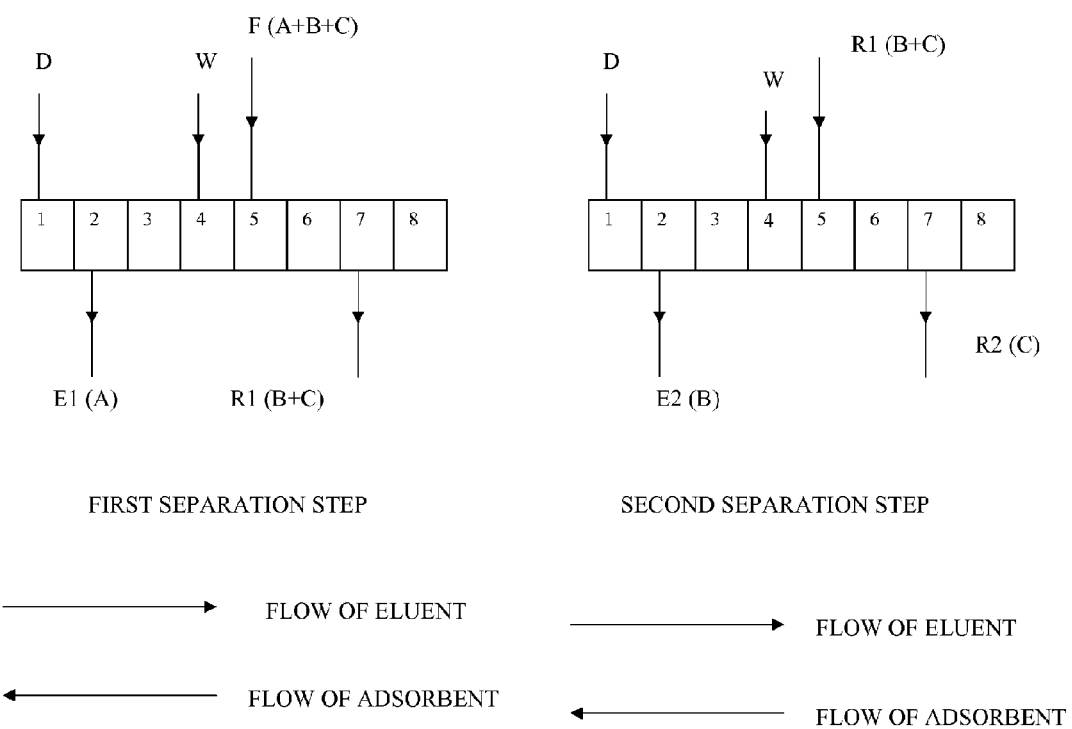
FIG. 8 illustrates a particularly preferred embodiment of the invention for purifying EPA from faster and slower running components (i.e. more polar and less polar impurities).

A most preferred embodiment is illustrated in FIG. 8. A feed mixture F comprising the PUPA product (B) and more polar (C) and less polar (A) components is introduced into the top of column 5 in the chromatographic apparatus used in the first separation step. Organic solvent desorbent is introduced into the top of column 1 of the chromatographic apparatus used in the first separation step. Water is introduced into the top of column 4 of the chromatographic apparatus used in the first separation step. In the first separation step, the less polar components (A) are removed as extract stream E1 from the bottom of column 2. The PUFA product (B) and more polar components (C) are removed as raffinate stream R1 from the bottom of column 7. Raffinate stream R1 is the intermediate product which is then purified in the second separation step, by being introduced into the chromatographic apparatus used in the second separation step at the top of column 5. Organic solvent desorbent is introduced into the top of column 1 in the chromatographic apparatus used in the second separation step. Water is introduced into the top of column 4 in the chromatographic apparatus used in the second separation step. In the second separation step, the more polar components (C) are removed as raffinate stream R2 at the bottom of column 7. The PUFA product (B) is collected as extract stream E2 at the bottom of column 2.

In this most preferred embodiment, organic solvent is typically introduced into the top of column 1 of the chromatographic apparatus used in the first separation step.

In this most preferred embodiment, water is typically introduced into the top of column 4 of the chromatographic apparatus used in the first separation step.

In this most preferred embodiment, organic solvent is typically introduced into the top of column 1 of the chromatographic apparatus used in the second separation step.

In this most preferred embodiment, organic solvent is typically introduced into the top of column 4 of the chromatographic apparatus used in the second separation step.

In this most preferred embodiment, the feed stream is typically introduced into the top of column 5 of the chromatographic apparatus used in the first separation step.

In this most preferred embodiment, a first raffinate stream is typically collected as the intermediate product from the bottom of column 7 of the chromatographic apparatus used in the first separation step. This intermediate product is then purified in the second separation step and is typically introduced into the top of column 5 of the chromatographic apparatus used in the second separation step. The first raffinate stream may optionally be collected in a container before being purified in the second separation step.

In this most preferred embodiment, a first extract stream is typically removed from the bottom of column 2 of the chromatographic apparatus used in the first separation step. The first extract stream may optionally be collected in a container and reintroduced into the top of column 3 of the chromatographic apparatus used in the first separation step.

In this most preferred embodiment, a second raffinate stream is typically removed from the bottom of column 7 of the chromatographic apparatus used in the second separation step.

In this most preferred embodiment, a second extract stream is typically collected from the bottom of column 2 of the chromatographic apparatus used in the second separation step. This second extract stream typically contains the purified PUFA product. The second extract stream may optionally be collected in a container and reintroduced into the top of column 3 of the chromatographic apparatus used in the second separation step.

In this most preferred embodiment, the eluent used is typically aqueous alcohol, preferably aqueous methanol. The water:alcohol ratio is typically from 0.5:99.5 to 6:94 parts by volume.

In this most preferred embodiment, the rate at which liquid collected via the extract stream from the first separation step is recycled back into the chromatographic apparatus used in the first separation step is typically faster than the rate at which liquid collected via the extract stream from the second separation step is recycled back into the chromatographic apparatus used in the second separation step.

In this most preferred embodiment, the aqueous organic solvent eluent is substantially the same in each separation step.

Although the embodiment of FIG. 8 is configured as shown in FIG. 10a, the configurations shown in FIGS. 10b and 10c could also be used in this embodiment.

A further most preferred embodiment is illustrated in FIG. 9. A feed mixture F comprising the PUFA product (B) and more polar (C) and less polar (A) components is introduced into the top of column 5 in the chromatographic apparatus used in the first separation step. Aqueous organic solvent desorbent is introduced into the top of column 1 in the chromatographic apparatus used in the first separation step. In the first separation step, the less polar components (A) are removed as extract stream E1 from the bottom of column 2. The PUFA product (B) and more polar components (C) are removed as raffinate stream R1 from the bottom of column 7.

Raffinate stream R1 is the intermediate product which is purified in the second separation step by being introduced into the top of column 4 of the chromatographic apparatus used in the second separation step. Aqueous organic solvent desorbent is introduced into the top of column 1 in the chromatographic apparatus used in the second separation step. In the second separation step, the more polar components (C) are removed as raffinate stream R2 at the bottom of column 7. The PUFA product (B) is collected as extract stream E2 at the bottom of column 2.

In this most preferred embodiment, aqueous organic solvent is typically introduced into the top of column 1 in the chromatographic apparatus used in the first separation step.

In this most preferred embodiment, aqueous organic solvent is typically introduced into the top of column 9 in the chromatographic apparatus used in the second separation step.

In this most preferred embodiment, the feed stream is typically introduced into the top of column 5 in the chromatographic apparatus used in the first separation step.

In this most preferred embodiment, a first raffinate stream is typically collected as the intermediate product from the bottom of column 7 of the chromatographic apparatus used in the first separation step. This intermediate product is then purified in the second separation step and is typically introduced into the top of column 5 of the chromatographic apparatus used in the second separation step. The first raffinate stream may optionally be collected in a container before being purified in the second separation step.

In this most preferred embodiment, a first extract stream is typically removed from the bottom of column 2 of the chromatographic apparatus used in the first separation step. The first extract stream may optionally be collected in a container and a portion reintroduced into the top of column 3 of the chromatographic apparatus used in the first separation step. The rate of recycle of liquid collected via the extract stream in the first separation step back into the chromatographic apparatus used in the first separation step is the rate at which liquid is pumped from this container into the top of column 3.

In this most preferred embodiment, a second raffinate stream is typically removed from the bottom of column 7 of the chromatographic apparatus used in the first separation step.

In this most preferred embodiment, a second extract stream is typically collected from the bottom of column 2 of the chromatographic apparatus used in the first separation step. This second extract stream typically contains the purified PUFA product. The second extract stream may optionally be collected in a container and a portion reintroduced into the top of column 3 of the chromatographic apparatus used in the first separation step. The rate of recycle of liquid collected via the extract stream from the second separation step back into the chromatographic apparatus used in the second separation step is the rate at which liquid is pumped from this container into the top of column 3.

In this most preferred embodiment, the eluent used is typically aqueous alcohol, preferably aqueous methanol. The water:alcohol ratio is typically from 0.5:99.5 to 6:94 parts by volume.

In this most preferred embodiment, the rate at which liquid collected via the extract stream from the first separation step is recycled back into the chromatographic apparatus used in the first separation step is typically faster than the rate at which liquid collected via the extract stream from the second separation step is recycled back into the chromatographic apparatus used in the second separation step.

In this most preferred embodiment, the aqueous organic solvent eluent is substantially the same in each separation step.

Although the embodiment of FIG. 9 is configured as shown in FIG. 10a, the configurations shown in FIGS. 10b and 10c could also be used in this embodiment.

The process of the invention allows much higher purities of PUFA product to be achieved than have been possible with conventional chromatographic techniques. PUFA products produced by the process of the invention also have particularly advantageous impurity profiles, which are quite different from those observed in oils prepared by known techniques. The present invention therefore also relates to compositions comprising a PUFA product, for example one obtainable by the process of the present invention.

In practice, the process of the present invention will generally be controlled by a computer. The present invention therefore also provides a computer program for controlling a chromatographic apparatus as defined herein, the computer program containing code means that when executed instruct the apparatus to carry out the process of the invention.

The following Examples illustrate the invention.

EXAMPLES

Example 1

A fish oil derived feedstock (55 weight % EPA EE, 5 weight % DHA EE) is fractionated using an actual moving bed chromatography system using bonded C18 silica gel (particle size 300 microns, particle porosity 150 angstroms) as stationary phase and aqueous methanol (containing 7.5% water) as eluent according to the system schematically illustrated in FIG. 9.

The first separation step was carried out on an SMB apparatus having 8 columns (diameter: 76.29 mm, length: 914.40 mm) which are connected in series as shown in FIG. 9. The intermediate product raffinate from the first separation step was isolated and purified in a second separation step using the same sequence of columns as above.

EPA was produced with purity 97%

The operating parameters and flow rates are as follows.

Step time: 500 secs
Cycle time: 133.33 mins

Figure 11:
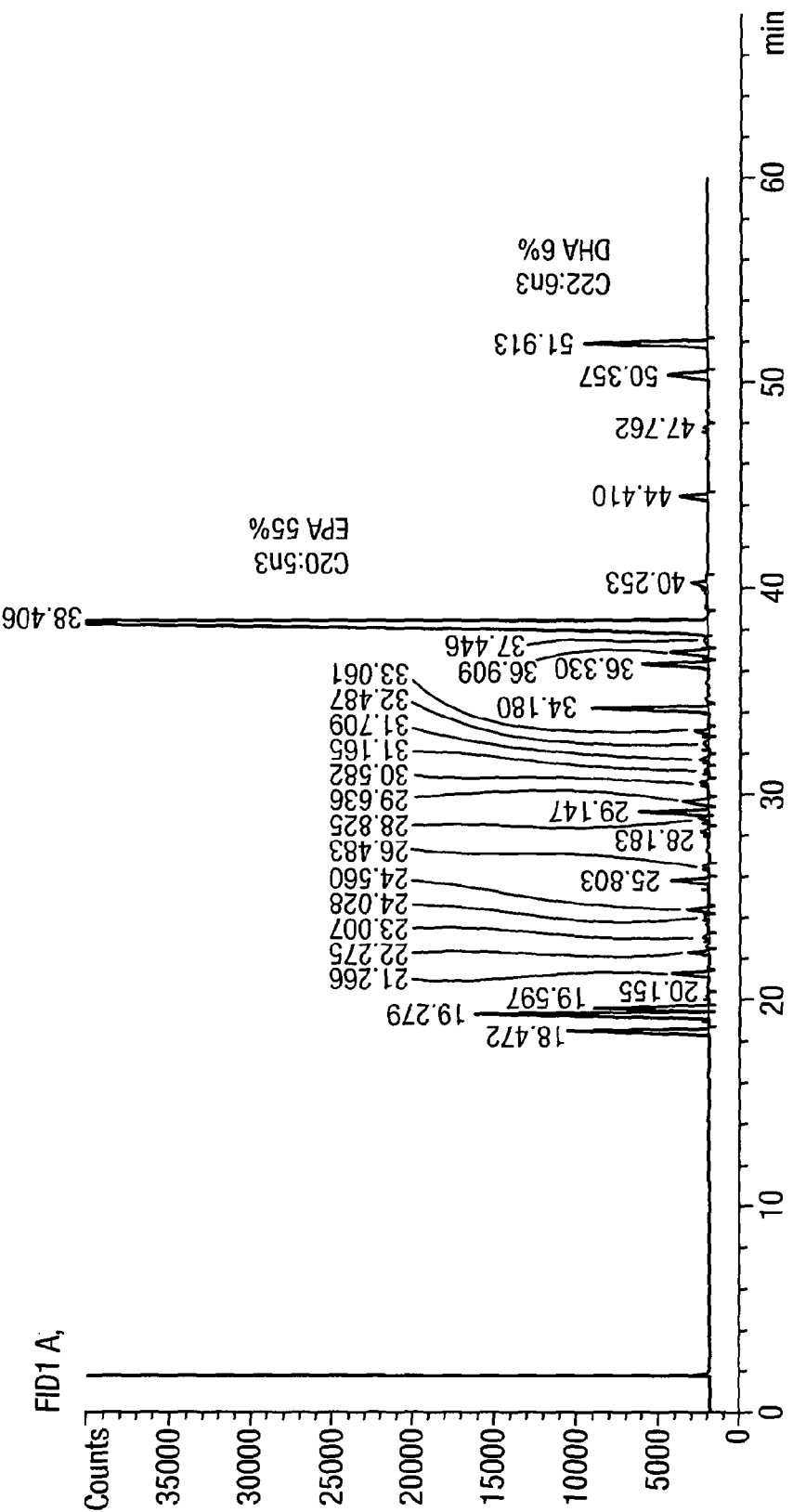
FIG. 11 shows a GC analysis of an EPA-rich feedstock which can suitably be used as the feed mixture in the process of the present invention.
Figure 12:
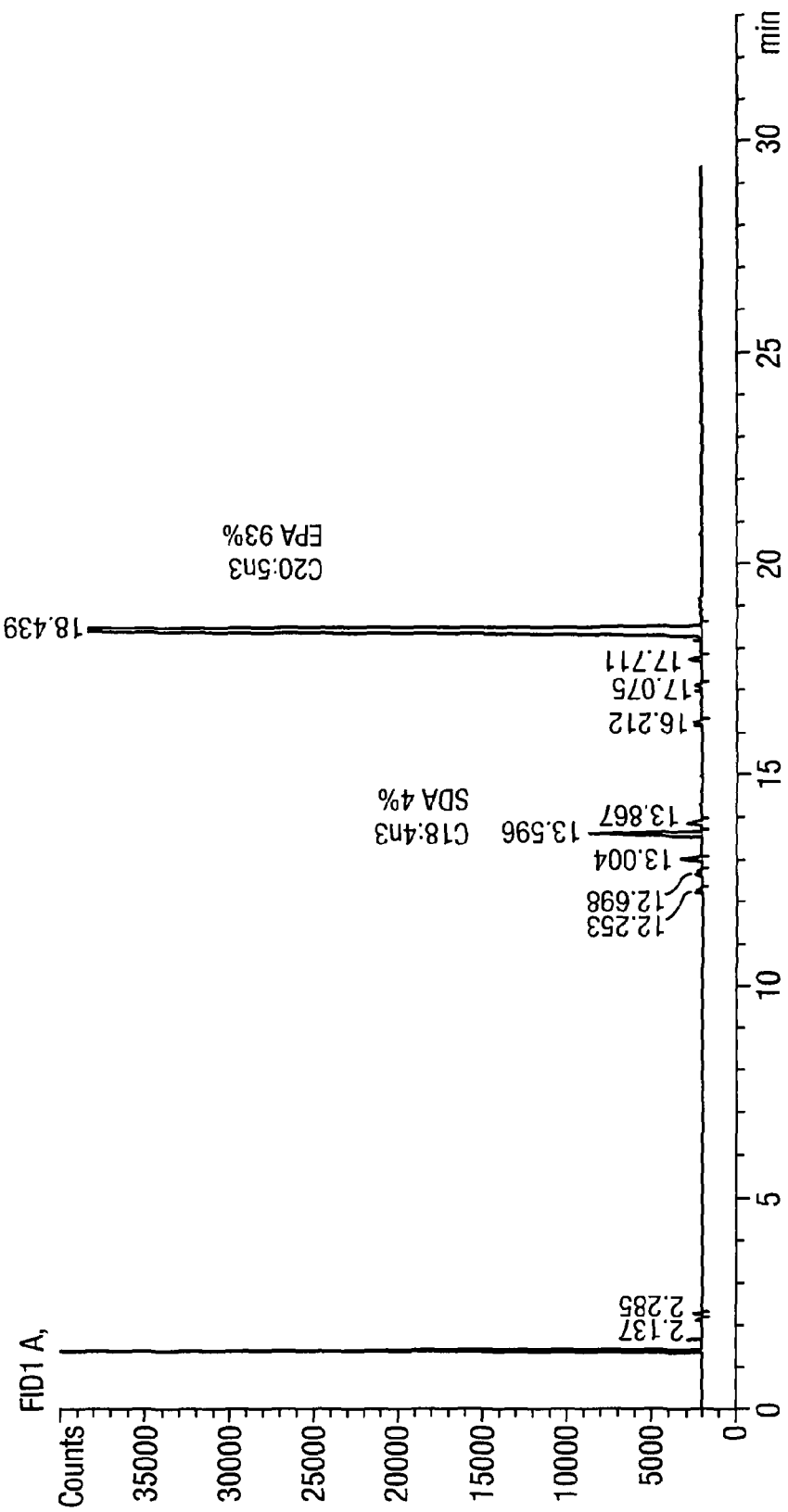
FIG. 12 shows a GC analysis of the raffinate intermediate product obtained in the first separation step of a process according to the present invention.
Figure 13:
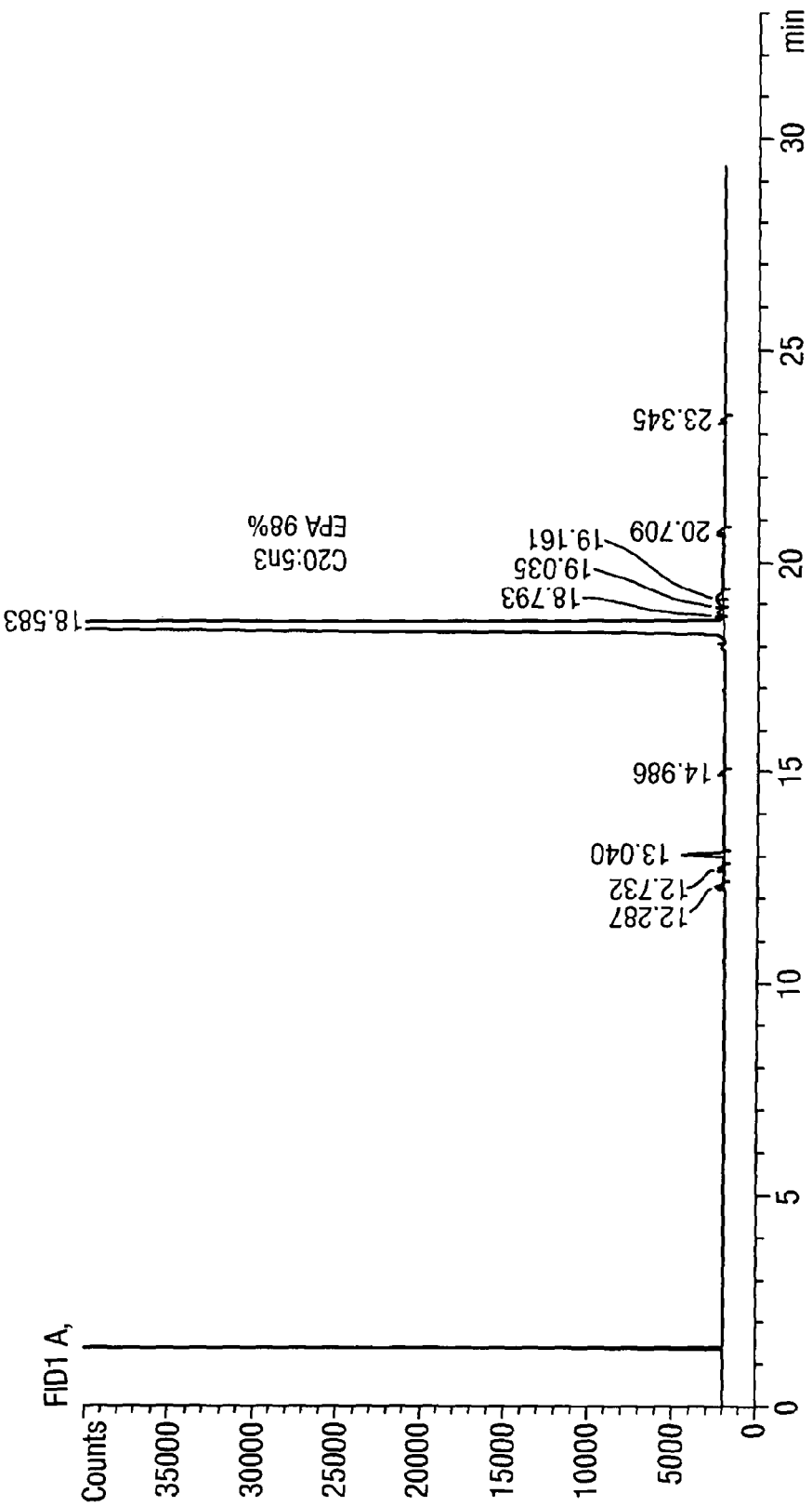
FIG. 13 shows a GC analysis of the final EPA product from the second separation step of a process according to the present invention.

First Separation Step
  Feedstock (F) feed rate: 25 ml/min
  Desorbent feed rate (D1): 2050 ml/min
  Extract container accumulation rate (E1): 1125 ml/min
  Extract recycle rate (D1-E1): 925 ml/min
  Raffinate rate (R1): 950 ml/min Second Separation Step
  Desorbent feed rate (D2): 1700 ml/min
  Extract container accumulation rate (E2): 900 ml/min
  Extract recycle rate (D2-E2): 800 ml/min
  Raffinate rate (R2): 800 ml/min A GC trace of the EPA feedstock is shown as FIG. 11.
A GC trace of the raffinate intermediate product obtained in the first separation step is shown as FIG. 12.
A GC trace of the final EPA product is shown as FIG. 13.

Example 2

A fish oil derived feedstock (55 weight % EPA EE, 5 weight % DHA EE) is fractionated using an actual moving bed chromatography system using bonded C18 silica gel (particle size 300 microns, particle porosity 150 angstroms) as stationary phase and aqueous methanol (containing 8 wt % water) as eluent according to the system schematically illustrated in FIG. 9, except that a fifteen column array was used instead of an eight column array.

The first separation step was carried out on an SMB apparatus having 15 columns (diameter: 150 mm, length: 813 mm) which are connected in series as shown in FIG. 9. The intermediate product from the first separation step was isolated and purified in a second separation step using the same sequence of columns as above.

Figure 14:
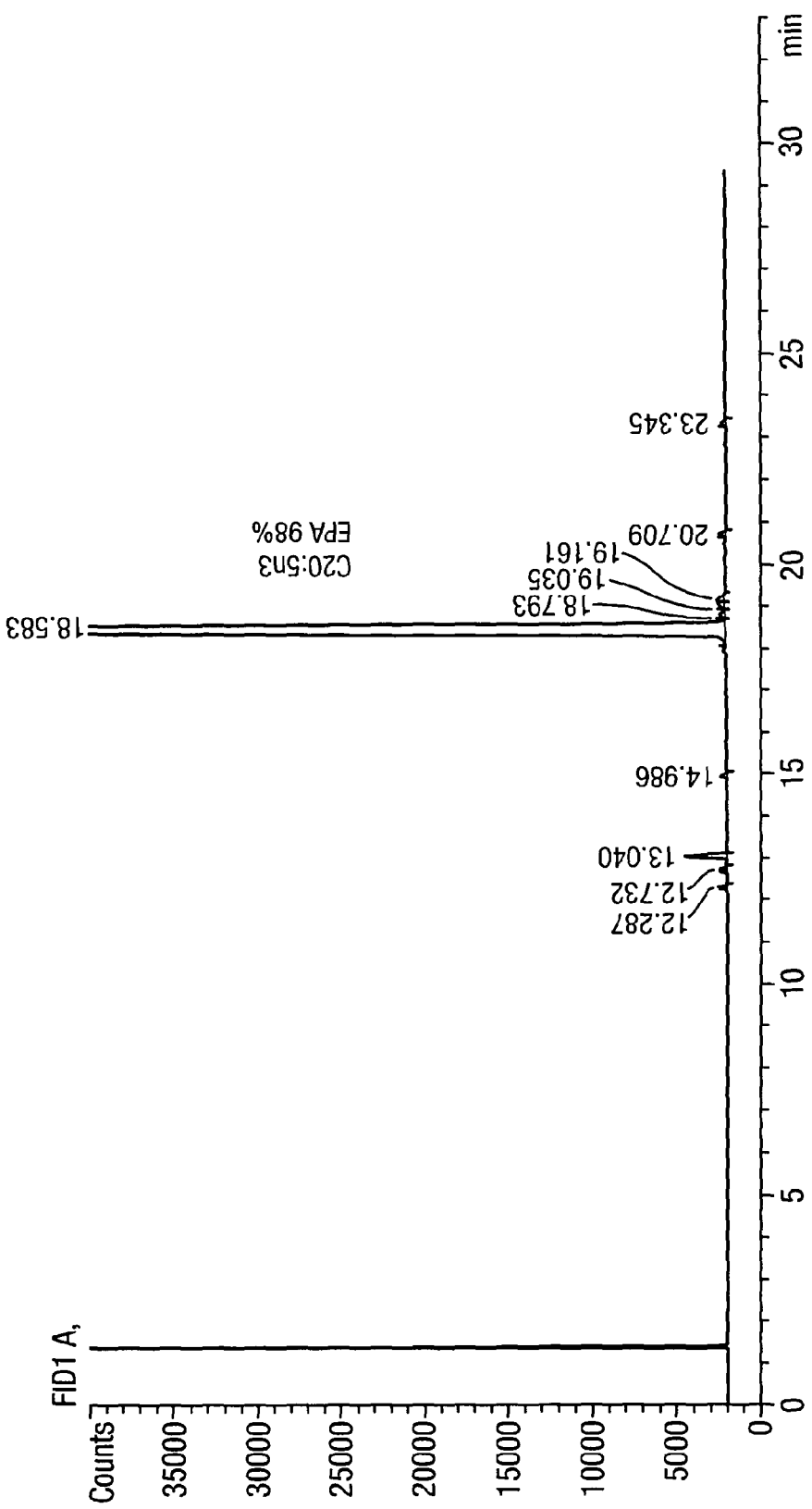
FIG. 14 shows a GC analysis of the final EPA product from the second separation step of a process according to the present invention.

EPA was produced with purity 98%.
Step time: 1200 secs
First Separation Step
Feed (F): 35 ml/min
Desorb (D1): 2270 ml/min
Extract separation E1: 1320 ml/min
Extract recycle rate (D1-E1): 950 ml/min
Raffinate separation R1: 950 ml/min
Second Separation Step
Desorb (D2): 1510 ml/min
Extract separation E2: 850 ml/min
Extract recycle rate (D2-E2): 660 ml/min
Raffinate separation R2: 670 ml/min A GC trace of the EPA product produced is shown as FIG. 14.

Reference Example 1

An experiment was carried out to compare the amount of environmental pollutants present in two PUFA products produced by SMB with similar oils prepared by distillation. The pollutant profiles of the oils are shown in Table 1 below.

TABLE 1

| Parameter | Release Specification | Distilled oil [1] | Distilled oil [2] | PUFA product produced by SMB [1] | PUFA product produced by SMB [2] |
|---|---|---|---|---|---|
| Polyaromatic Hydrocarbons (PAH) (µg/kg) | | | | | |
| Benzo(a)pyrene | NMT 2.0 | 0.90 | 0.90 | <0.05 | <0.05 |
| Impurities | | | | | |
| Dioxins and Furans PCDDs and PCDFs[1] (pg WHO-PCDD/F-TEQ/g) | NMT 2.0 | 0.46 | 0.37 | 0.2 | 0.184 |
| PCBs (mg/kg) | NMT 0.09 | 0.0037 | 0.0103 | 0.0007 | 0.0012 |
| Sum of Dioxins, Furans and Dioxin-like PCBs[2] (pg WHO-PCDD/F-PCB-TEQ/g) | NMT 10.0 | 1.03 | 0.466 | 0.30 | 0.298 |

[1]Dioxin limits include the sum of polychlorinated dibenzeno-para-dioxins (PCDDs) and polychlorinated dibenzofurans (PCDFs) and expressed in World Health Organisation (WHO) toxic equivalents using WHO-toxic equivalent factors (TEFs). This means that analytical results relating to 17 individual dioxin congeners of toxicological concern are expressed in a single quantifiable unit: TCDD toxic equivalent concentration or TEQ
[2]Maximum for dioxin and Furans remains at 2 pg/g

Reference Example 2

An experiment was carried out to determine the amount of isomeric impurities present in an oil prepared by SMB compared with an equivalent oil prepared by distillation.

Figure 15:
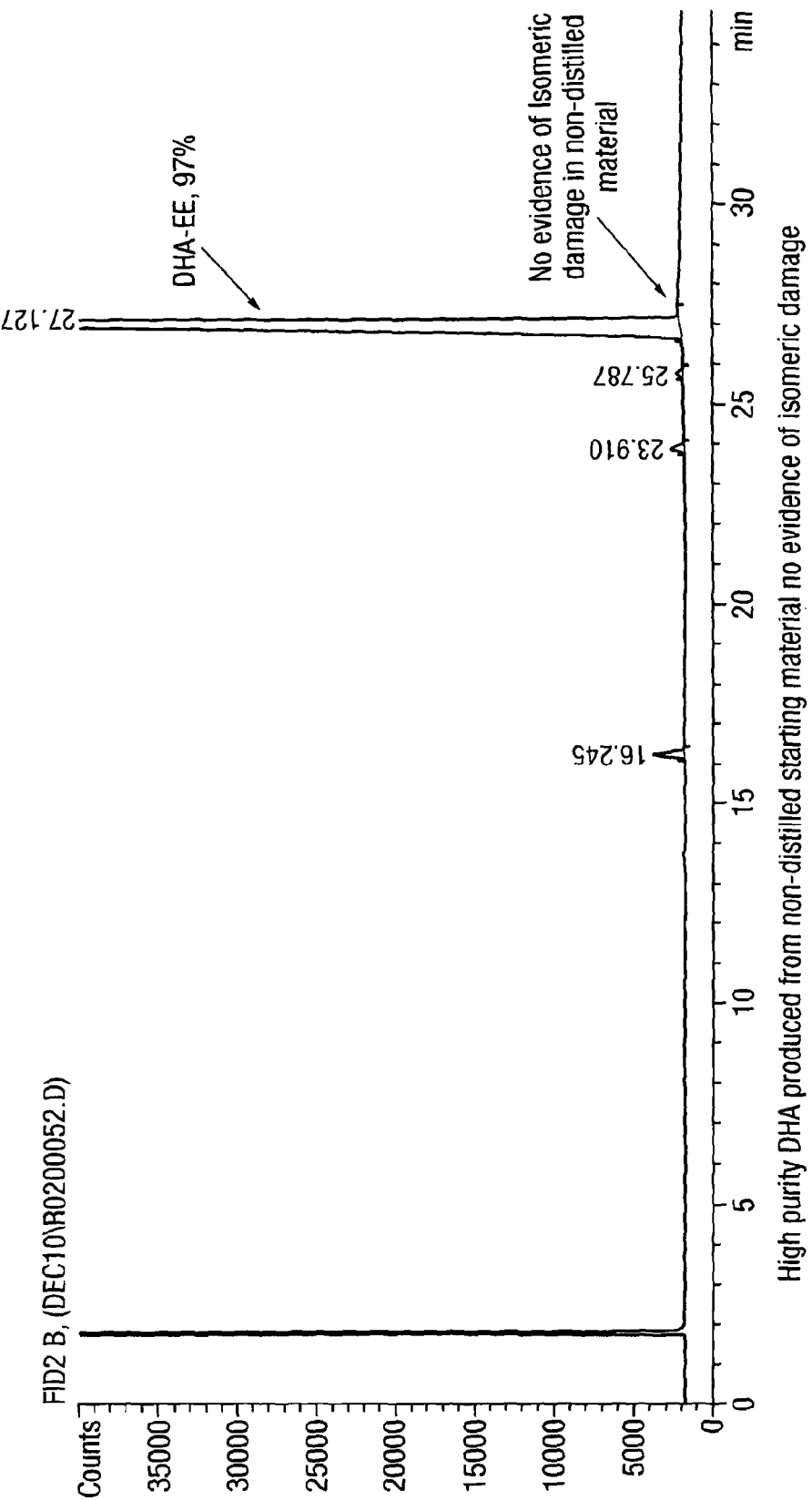
FIG. 15 shows a GC FAMES trace of a DHA product produced by SMB.

A GC trace of the DHA-rich oil prepared by SMB is shown as FIG. 15. There is no evidence of isomeric impurities in the GC trace.

Figure 16:
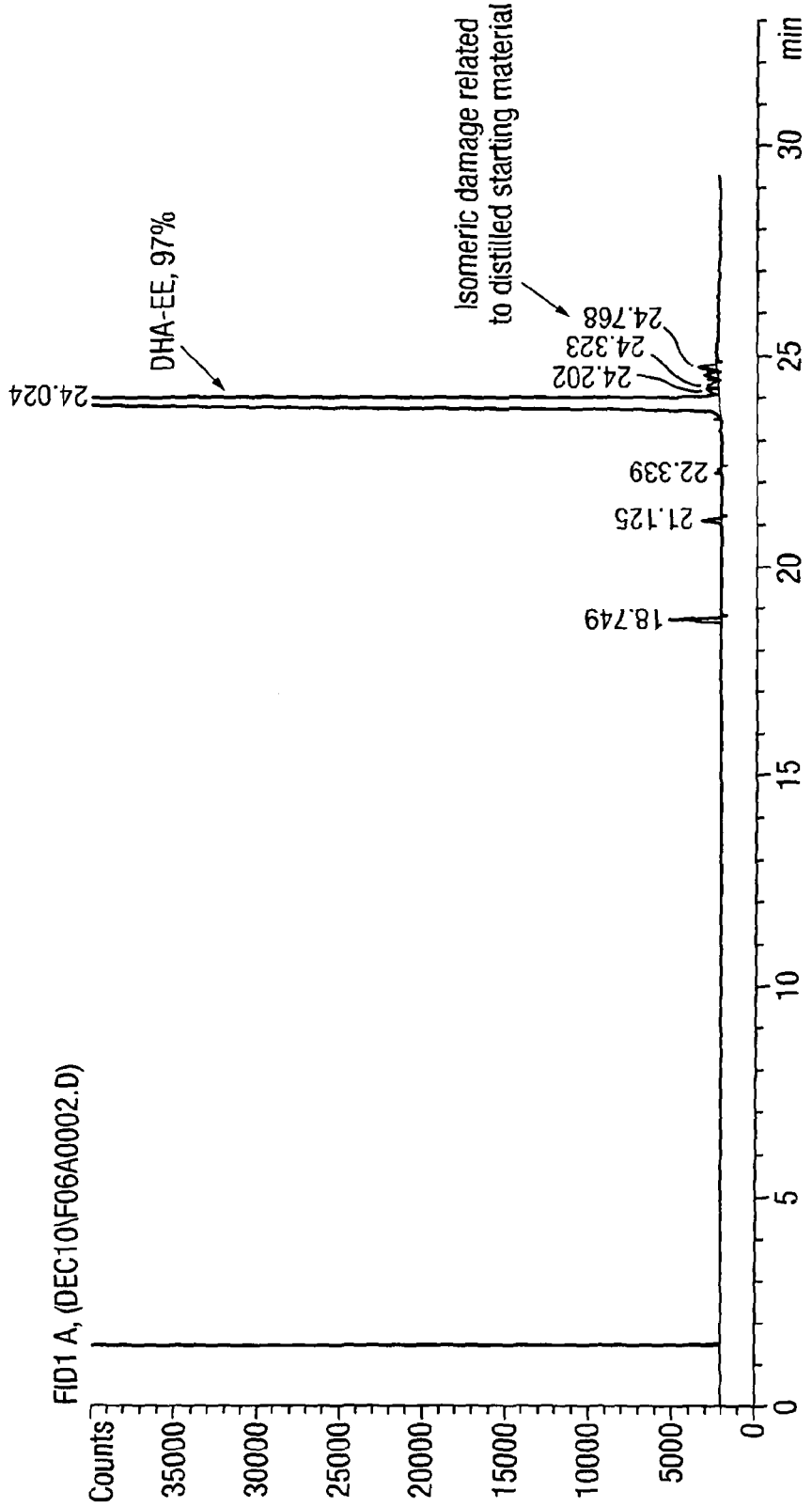
FIG. 16 shows a GC FAMES trace of a DHA product produced by distillation.

A GC trace of the oil prepared by distillation is shown as FIG. 16. The four peaks with longer elution times than the DHA peak correspond to DHA isomers. From the GC trace it can be seen that the oil prepared by distillation contains about 1.5 wt % of isomeric impurities.

Reference Example 3

Two EPA-rich products produced by SMB were compared with EPA-rich oils produced by distillation. The wt % analysis of their component PUFAs is shown below.

| Fatty Acid | PUFA product produced by SMB [1] | PUFA product produced by SMB [2] | Distilled oil [1] | Distilled oil [2] |
|---|---|---|---|---|
| EPA (C20:5n-3) | 98.33 | 97.04 | 98.09 | 98.14 |
| DHA (C22:6n-3) | 0.15 | <LOD | 0.34 | <LOD |
| C18:3 n-3 | <LOD | 0.28 | 0.24 | <LOD |
| C18:4 n-3 | 0.33 | 0.20 | 0.14 | 0.26 |
| C20:4 n-3 | 0.14 | 0.45 | 0.18 | 0.46 |
| C21:5 n-3 | <LOD | <LOD | <LOD | <LOD |
| C22:5 n-3 | 0.32 | <LOD | <LOD | <LOD |
| Total Omega-3 | 99.27 | 97.97 | 98.94 | 98.86 |
| C18:3 n-6 | <LOD | <LOD | 0.05 | <LOD |
| C20:3 n-6 | <LOD | <LOD | 0.13 | 0.11 |
| C20:4 n-6 | <LOD | 0.21 | 0.26 | 0.37 |
| Total Omega-6 | <LOD | 0.21 | 0.44 | 0.48 |

Reference Example 4

An EPA/DHA-rich product produced by SMB was compared with an EPA/DHA-rich oil produced by distillation. The wt % analysis of their component PUFAs is shown below.

| Fatty Acid | Maxomega Ethyl Ester (Omega-3 90 ethyl esters) Area % | Distilled Ethyl Ester (Omega-3 90 ethyl esters[1]) Area % |
|---|---|---|
| EPA (C20:5n-3) | 53.3 | 46.6 |
| DHA (C22:6n-3) | 32.9 | 38.2 |
| TOTAL EPA + DHA | 86.2 | 84.8 |
| C18:3 n-3 | 0.3 | 0.1 |
| C18:4 n-3 | 1.2 | 2.0 |
| C20:4 n-3 | 1.8 | 0.6 |

| Fatty Acid | Maxomega Ethyl Ester (Omega-3 90 ethyl esters) Area % | Distilled Ethyl Ester (Omega-3 90 ethyl esters[1]) Area % |
| --- | --- | --- |
| C21:5 n-3 | 2.7 | 1.8 |
| C22:5 n-3 | 5.0 | 3.8 |
| Total Omega-3 | 97.2 | 93.1 |
| C18:2 n-6 | 0.2 | 0.1 |
| C18:3 n-6 | <0.1 | 0.2 |
| C20:3 n-6 | <0.1 | 0.1 |
| C20:4 n-6 | 2.0 | 2.6 |
| C22:4 n-6 | <0.1 | 0.1 |
| C22:5 n-6 | 0.6 | 1.0 |
| Total Omega-6 | 2.8 | 4.1 |

The invention claimed is:

1. A chromatographic separation process for recovering a polyunsaturated fatty acid (PUFA) product from a feed mixture, which process comprises the steps of:
   (i) purifying the feed mixture in a first separation step in a simulated or actual moving bed chromatography apparatus having a plurality of linked chromatography columns containing, as eluent, an aqueous organic solvent, to obtain an intermediate product; and
   (ii) purifying the intermediate product obtained in (i) in a second separation step using a simulated or actual moving bed chromatography apparatus having a plurality of linked chromatography columns containing, as eluent, an aqueous organic solvent, to obtain the PUFA product; wherein
   (a) the first and second separation steps are carried out sequentially on the same chromatography apparatus, the intermediate product being recovered between the first and second separation steps and the process conditions in the chromatography apparatus being adjusted between the first and second separation steps such that the PUFA product is separated from different components of the feed mixture in each separation step; or
   (b) the first and second separation steps are carried out on separate first and second chromatography apparatuses respectively, the intermediate product obtained from the first separation step being introduced into the second chromatography apparatus, and the PUFA product being separated from different components of the feed mixture in each separation step; and wherein (1) part of an extract stream from the apparatus used in the first separation step is recycled back into the apparatus used in the first separation step; and/or
   (2) part of a raffinate stream from the apparatus used in the first separation step is recycled back into the apparatus used in the first separation step; and/or
   (3) part of an extract stream from the apparatus used in the second separation step is recycled back into the apparatus used in the second separation step; and/or
   (4) part of a raffinate stream from the apparatus used in the second separation step is recycled back into the apparatus used in the second separation step, and
   wherein (I) a rate at which liquid collected via one or both of the extract and raffinate streams in the first separation step is recycled back into the apparatus used in that separation step is adjusted such that the PUFA product can be separated from different components of the feed mixture in each separation step; and/or
   (II) a rate at which liquid collected via one or both of the extract and raffinate streams in the second separation step is recycled back into the apparatus used in that separation step is adjusted such that the PUFA product can be separated from different components of the feed mixture in each separation step.

2. The process according to claim 1, wherein each apparatus has an extract stream and a raffinate stream from which liquid can be collected from said plurality of linked chromatography columns.

3. The process according to claim 1, wherein the intermediate product obtained in the first separation step is enriched in the PUFA product compared to the feed mixture.

4. The process according to claim 1, wherein (a) the intermediate product is collected as the raffinate stream in the first separation step, and the PUFA product is collected as the extract stream in the second separation step; or (b) the intermediate product is collected as the extract stream in the first separation step, and the PUFA product is collected as the raffinate stream in the second separation step.

5. The process according to claim 1, wherein the PUFA product is separated from less polar components of the feed mixture in the first separation step, and the PUFA product is separated from more polar components of the feed mixture in the second separation step.

6. The process according to claim 1, wherein the PUFA product comprises at least one w-3 PUFA.

7. The process according to claim 6, wherein the PUFA product comprises EPA and/or DHA.

8. The process according to claim 1, wherein the eluent is a mixture of water and an alcohol, an ether, an ester, a ketone or a nitrile.

9. The process according to claim 8, wherein the eluent is a mixture of water and methanol.

10. The process according to claim 1, wherein the feed mixture is a fish oil or fish-oil derived feedstock, the PUFA product is EPA or EPA ethyl ester, and the PUFA product is produced in a purity greater than 90% purity, preferably greater than 95% purity, and more preferably greater than 97% purity.

11. The process according to claim 1, wherein the rate at which liquid collected via the extract stream in the first separation step is recycled back into the chromatography apparatus used in the first separation step differs from the rate at which liquid collected via the extract stream in the second separation step is recycled back into the chromatography apparatus used in the second separation step.

12. The process according to claim 1, wherein the rate at which liquid collected via the raffinate stream in the first separation step is recycled back into the chromatography apparatus used in the first separation step differs from the rate at which liquid collected via the raffinate stream in the second separation step is recycled back into the chromatography apparatus used in the second separation step.

13. The process according to claim 1, wherein the rate at which liquid collected via the extract stream in the first separation step is recycled back into the chromatographic apparatus used in the first separation step is faster than the rate at which liquid collected via the extract stream in the second separation step is recycled back into the chromatographic apparatus used in the second separation step.

14. A computer program for controlling a chromatography apparatus according to claim 1, which computer program contains code means that, when executed, instructs the apparatus to carry out a process according to claim 1.

15. A PUFA product produced by the process of claim 1.

16. The process according to claim 1, wherein in option (b) the intermediate product is passed from the first separation step to the second separation step directly or indirectly.

17. The process according to claim 1, wherein after the intermediate product is obtained in the first separation step, the aqueous organic solvent eluent is partly or totally removed before the intermediate product is purified in the second separations step.

* * * * *

UNITED STATES PATENT AND TRADEMARK OFFICE
CERTIFICATE OF CORRECTION

| | | |
|---|---|---|
| PATENT NO. | : 9,234,157 B2 | Page 1 of 1 |
| APPLICATION NO. | : 13/880154 | |
| DATED | : January 12, 2016 | |
| INVENTOR(S) | : Adam Kelliher et al. | |

It is certified that error appears in the above-identified patent and that said Letters Patent is hereby corrected as shown below:

In the title, item (54) on the title page: "SMB Process" should be changed to --Improved-- SMB Process.

Signed and Sealed this
Nineteenth Day of April, 2016

Michelle K. Lee
*Director of the United States Patent and Trademark Office*